United States Patent
Yeo et al.

(10) Patent No.: US 10,019,782 B2
(45) Date of Patent: Jul. 10, 2018

(54) METHOD AND APPARATUS FOR DISPLAYING CONTENT

(71) Applicant: Samsung Electronics Co., Ltd., Suwon-si (KR)

(72) Inventors: Sin-oug Yeo, Seoul (KR); Sun Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 535 days.

(21) Appl. No.: 13/932,075

(22) Filed: Jul. 1, 2013

(65) Prior Publication Data

US 2014/0002471 A1  Jan. 2, 2014

(30) Foreign Application Priority Data

Jun. 29, 2012 (KR) ........................ 10-2012-0071371

(51) Int. Cl.
*G06T 11/60* (2006.01)
*G06T 19/00* (2011.01)
(Continued)

(52) U.S. Cl.
CPC .............. *G06T 5/00* (2013.01); *G06F 3/0346* (2013.01); *G06F 3/0481* (2013.01);
(Continued)

(58) Field of Classification Search
CPC ......... G06T 11/60; G06T 15/30; G06T 11/00; G06T 19/00; G06T 2210/22; G06T 11/20;
(Continued)

(56) References Cited

U.S. PATENT DOCUMENTS

| 7,199,787 | B2 | 4/2007 | Lee et al. |
| 2004/0196259 | A1* | 10/2004 | Bradski .............. G06F 1/1626 345/158 |

(Continued)

FOREIGN PATENT DOCUMENTS

| CN | 1402116 A | 3/2003 |
| CN | 101510138 A | 8/2009 |

(Continued)

OTHER PUBLICATIONS

Search Report dated Oct. 11, 2013, issued by the International Searching Authority in counterpart International Application No. PCT/KR2013/005553.

(Continued)

*Primary Examiner* — Ke Xiao
*Assistant Examiner* — Andrew Shin
(74) *Attorney, Agent, or Firm* — Sughrue Mion, PLLC

(57) ABSTRACT

Provided are a method and apparatus for displaying content. The method includes receiving content displayed on an external display apparatus; displaying only a partial region of an entire region of the content on a device; generating additional information corresponding to the partial region, based on a user input; and providing the additional information to the external display apparatus, and wherein the additional information comprises information provided to the external display apparatus to be applied to the content that is displayed on the external display apparatus.

19 Claims, 15 Drawing Sheets

(51) Int. Cl.
*G09G 5/14* (2006.01)
*G06F 3/14* (2006.01)
*G06F 3/01* (2006.01)
*G06F 3/0485* (2013.01)
*G06F 1/16* (2006.01)
*G06T 5/00* (2006.01)
*G06F 3/0488* (2013.01)
*G06F 3/0481* (2013.01)
*G06F 3/0346* (2013.01)
*H04H 20/08* (2008.01)
*H04H 60/80* (2008.01)
*H04N 21/41* (2011.01)
*H04N 21/4402* (2011.01)

(52) U.S. Cl.
CPC .......... *G06F 3/0488* (2013.01); *H04H 20/08* (2013.01); *H04H 60/80* (2013.01); *H04N 21/4126* (2013.01); *H04N 21/440245* (2013.01); *G06F 3/1454* (2013.01)

(58) Field of Classification Search
CPC .......... G09G 5/14; G09G 5/12; G06F 3/1415; G06F 3/1462; G06F 3/1423; G06F 3/1454; G06F 3/00; G06F 3/01; G06F 3/048; G06F 3/0485; G06F 1/1694
See application file for complete search history.

(56) References Cited

U.S. PATENT DOCUMENTS

| | | | |
|---|---|---|---|
| 2005/0071782 A1 | 3/2005 | Barrett et al. | |
| 2005/0091571 A1* | 4/2005 | Leichtling | G06F 3/1454 715/203 |
| 2008/0313546 A1* | 12/2008 | Nykamp | G06F 17/2211 715/738 |
| 2009/0085936 A1* | 4/2009 | Chen | G06F 3/0481 345/661 |
| 2009/0207189 A1 | 8/2009 | Lin et al. | |
| 2010/0011299 A1 | 1/2010 | Brodersen et al. | |
| 2010/0026608 A1 | 2/2010 | Adams et al. | |
| 2011/0010629 A1* | 1/2011 | Castro | G06F 3/1462 715/732 |
| 2012/0011568 A1* | 1/2012 | Tahan | G06F 3/0481 726/4 |
| 2012/0284646 A1* | 11/2012 | Sitrick | G06Q 10/10 715/753 |

FOREIGN PATENT DOCUMENTS

| | | |
|---|---|---|
| JP | 2003-134425 A | 5/2003 |
| KR | 100645163 B1 | 11/2006 |
| KR | 10-2009-0130785 A | 12/2009 |
| KR | 10-2010-0023256 A | 3/2010 |
| KR | 10-2011-0085332 A | 7/2011 |

OTHER PUBLICATIONS

Written Opinion dated Oct. 11, 2013, issued by the International Searching Authority in counterpart International Application No. PCT/KR2013/005553.
Communication dated Apr. 19, 2017 issued by the European Patent Office in counterpart European Patent Application No. 13174273.6.
Communication dated May 22, 2017 issued by the State Intellectual Property Office of P.R. China in counterpart Chinese Patent Application No. 201310271835.6.

* cited by examiner

METHOD AND APPARATUS FOR DISPLAYING CONTENT

CROSS-REFERENCE TO RELATED PATENT APPLICATION

This application claims priority from Korean Patent Application No. 10-2012-0071371, filed on Jun. 29, 2012, in the Korean Intellectual Property Office, the disclosure of which is incorporated herein in its entirety by reference.

BACKGROUND

1. Field

Exemplary embodiments relate to a method and apparatus for displaying a partial region of shared content.

2. Description of the Related Art

Due to development in multimedia and communication technologies, a user may use content by using various apparatuses in various environments. According to the recent digital convergence stream, smart phones have not only a phone function, but also perform various other functions and include other devices such as internet communication, digital cameras, MP3 players, games, providing broadcast content, providing financial services, etc. In addition, a user may check content, which is displayed on a display apparatus including a TV, by using a device such as a smart phone.

Accordingly, there is a demand for a technology for efficiently checking and editing content, which is displayed on a display apparatus, by using a device capable of communicating with the display apparatus.

SUMMARY

Exemplary embodiments provide a method of displaying a partial region of content, which is displayed on a display apparatus, on a device, and applying additional information about a partial region of content, which is generated in the device, to the display apparatus.

Exemplary embodiments also provide a method of displaying a partial region of content, which is displayed on a display apparatus, on a device, and displaying a partial region of content, which is changed in the device, on the display apparatus.

Exemplary embodiments also provide a method of enlarging and displaying a partial region of an image, which is displayed on a display apparatus, on a device, and applying an image of the partial region, which is changed in the device, to the display apparatus.

Exemplary embodiments also provide a method of, by a device, displaying and changing a partial region of an image, based on the image and information about a partial region of the image that is displayed on a display apparatus.

According to an aspect of an exemplary embodiment, there is provided a method of displaying content, the method performed by a device and including operations of receiving content displayed on an external display apparatus; displaying only a partial region of an entire region of the content on the device; and generating additional information corresponding to the partial region, based on a user input, and providing the additional information to the external display apparatus, wherein the additional information comprises information that is used by the external display apparatus to change or control the content displayed on the external display apparatus.

The additional information may include edition information about the partial region, and the edition information may include information about at least one of a line, a figure, and a color which are added, changed, or removed with respect to the partial region.

The additional information may include region information about the partial region, and the region information may be used by the external display apparatus to mark a region of the content displayed on the external display apparatus, wherein the region corresponds to the partial region displayed on the device.

The operation of displaying the partial region may include an operation of changing and displaying the partial region of the entire region of the content, based on the user input, and the operation of providing the additional information may include an operation of providing coordinate information about the changed partial region to the external display apparatus.

The operation of displaying the partial region may include operations of detecting movement of the device; and enlarging or reducing and displaying the partial region of the entire region of the content, based on the movement of the device.

The operation of receiving the content may include an operation of receiving the content from the external display apparatus.

The operation of receiving the content may include an operation of receiving the content from a separate server that is connected with the device and the external display apparatus.

The operation of displaying the partial region may include an operation of enlarging and displaying the partial region of the content.

The operation of displaying the partial region may further include operations of providing coordinate information about the partial region to the external display apparatus; receiving high image-quality content with respect to the partial region from the external display apparatus; and displaying the high image-quality content.

The operation of displaying the partial region may further include operations of providing coordinate information about the partial region to a separate server that is connected with the device and the external display apparatus; receiving high image-quality content with respect to the partial region from the server; and displaying the high image-quality content.

According to another aspect of an exemplary embodiment, there is provided a method of displaying content, the method performed by a device and including operations of receiving content displayed on an external display apparatus; displaying only a partial region of an entire region of the content on the device; changing the partial region, based on a user input; and providing the changed content to the external display apparatus, wherein the changed content is displayed on the external display apparatus.

The operation of changing the partial region may include an operation of applying additional information to the partial region.

The additional information may include edition information about the partial region, and the edition information may include information about at least one of a line, a figure, and a color which are added, changed, or removed with respect to the partial region.

The additional information may include region information about the partial region.

The operation of changing the partial region may include operations of detecting movement of the device; and enlarging or reducing and displaying the partial region of the entire region of the content, based on the movement of the device.

The operation of receiving the content may include an operation of receiving the content from the external display apparatus.

The operation of receiving the content may include an operation of receiving the content from a separate server that is connected with the device and the external display apparatus.

The operation of displaying the partial region may include an operation of enlarging and displaying the partial region of the content.

The operation of displaying the partial region may further include operations of providing coordinate information about the partial region to the external display apparatus; receiving high image-quality content with respect to the partial region from the external display apparatus; and displaying the high image-quality content.

The operation of displaying the partial region may further include operations of providing coordinate information about the partial region to a separate server that is connected with the device and the external display apparatus; receiving high image-quality content with respect to the partial region from the server; and displaying the high image-quality content.

According to another aspect of an exemplary embodiment, there is provided a method of displaying content, the method performed by a device and including operations of receiving an image displayed on an external display apparatus; enlarging a partial region of the image; displaying an image of the enlarged partial region; changing and displaying the image of the enlarged partial region on the device, based on a user input; and providing the changed image to the external display apparatus, wherein the changed image is displayed on the external display apparatus.

According to another aspect of an exemplary embodiment, there is provided a method of displaying content, the method performed by a device and including operations of receiving an image displayed on an external display apparatus and region information about a partial region of the image; displaying the partial region of the image on the device by using the region information; changing an image of the partial region, based on a user input; and providing the changed image to the external display apparatus, wherein the changed image that is provided to the external display apparatus is displayed on the external display apparatus.

According to another aspect of an exemplary embodiment, there is provided a device including a memory for storing at least one program; and a processor for allowing content to be displayed, by executing the at least one program, wherein the at least one program includes commands involving operations of receiving content displayed on an external display apparatus; displaying only a partial region of an entire region of the content on the device; generating additional information corresponding to the partial region, based on a user input; and providing the additional information to the external display apparatus, and wherein the additional information provided to the external display apparatus to be applied to the content that is displayed on the external display apparatus.

The additional information may include edition information about the partial region, and the edition information may include information about at least one of a line, a figure, and a color which are added, changed, or removed with respect to the partial region.

The additional information may include region information about the partial region, and the region information may be used by the external display apparatus to mark a region of the content displayed on the external display apparatus, wherein the region corresponds to the partial region displayed on the device.

The operation of displaying the partial region may include an operation of hanging and displaying the partial region of the entire region of the content, based on the user input, and the operation of providing the additional information may include an operation of providing coordinate information about the changed partial region to the external display apparatus.

The operation of displaying the partial region may include operations of detecting movement of the device; and enlarging or reducing and displaying the partial region of the entire region of the content, based on the movement of the device.

The operation of receiving the content may include an operation of receiving the content from the external display apparatus.

The operation of receiving the content may include an operation of receiving the content from a separate server that is connected with the device and the external display apparatus.

The operation of displaying the partial region may include an operation of enlarging and displaying the partial region of the entire region of the content.

The operation of displaying the partial region may further include operations of providing coordinate information about the partial region to the external display apparatus; receiving high image-quality content with respect to the partial region from the external display apparatus; and displaying the high image-quality content.

The operation of displaying the partial region may further include operations of providing coordinate information about the partial region to a separate server that is connected with the device and the external display apparatus; receiving high image-quality content with respect to the partial region from the server; and displaying the high image-quality content.

According to another aspect of an exemplary embodiment, there is provided a device including a memory for storing at least one program; and a processor for allowing content to be displayed, by executing the at least one program, wherein the at least one program includes commands involving operations of receiving content displayed on an external display apparatus; displaying only a partial region of an entire region of the content on the device; changing the partial region, based on a user input; and providing the changed content to the external display apparatus, and wherein the changed content is displayed on the external display apparatus.

The operation of changing the partial region may include an operation of applying additional information to the partial region.

The additional information may include edition information about the partial region, and the edition information may include information about at least one of a line, a figure, and a color which are added, changed, or removed with respect to the partial region.

The additional information may include region information about the partial region.

The operation of changing the partial region may include operations of detecting movement of the device; and enlarging or reducing and displaying the partial region of the entire region of the content, based on the movement of the device.

The operation of receiving the content may include an operation of receiving the content from the external display apparatus.

The operation of receiving the content may include an operation of receiving the content from a separate server that is connected with the device and the external display apparatus.

The operation of displaying the partial region may include an operation of enlarging and displaying the partial region of the content.

The operation of displaying the partial region may further include operations of providing coordinate information about the partial region to the external display apparatus; receiving high image-quality content with respect to the partial region from the external display apparatus; and displaying the high image-quality content.

The operation of displaying the partial region may further include operations of providing coordinate information about the partial region to a separate server that is connected with the device and the external display apparatus; receiving high image-quality content with respect to the partial region from the server; and displaying the high image-quality content.

According to another aspect of an exemplary embodiment, there is provided a device including a memory for storing at least one program; and a processor for allowing content to be displayed, by executing the at least one program, wherein the at least one program includes commands involving operations of receiving an image displayed on an external display apparatus; enlarging a partial region of the image; displaying an image of the enlarged partial region on the device; changing and displaying the image of the enlarged partial region, based on a user input; and providing the changed image to the external display apparatus, and wherein the changed image is displayed on the external display apparatus.

According to another aspect of an exemplary embodiment, there is provided a device including a memory for storing at least one program; and a processor for allowing content to be displayed, by executing the at least one program, wherein the at least one program includes commands involving operations of receiving an image displayed on an external display apparatus and region information about a partial region of the image; displaying the partial region of the image, on the device, by using the region information; changing an image of the partial region, based on a user input; and providing the changed image to the external display apparatus, and wherein the changed image that is provided to the external display apparatus is displayed on the external display apparatus.

According to another aspect of an exemplary embodiment, there is provided a method of providing additional information about content, the method performed by a server and includes: providing content to a device and an external display apparatus; receiving additional information corresponding to a partial region of an entire region of the content that is displayed on the device; and providing the additional information to the external display apparatus. The additional information may be provided to the external display apparatus to be applied to the content that is provided to the external display apparatus.

According to another aspect of an exemplary embodiment, there is provided a method of providing additional information about content, the method performed by a server and includes: providing content to a device and an external display apparatus; receiving additional information corresponding to a partial region of an entire region of the content that is displayed on the device; applying the additional information to the content; and providing the content having the additional information applied thereto to the external display apparatus.

BRIEF DESCRIPTION OF THE DRAWINGS

The above and other features and advantages of the exemplary embodiments will become more apparent by describing in detail the exemplary embodiments with reference to the attached drawings in which.

DETAILED DESCRIPTION OF THE EXEMPLARY EMBODIMENTS

Figure 1:
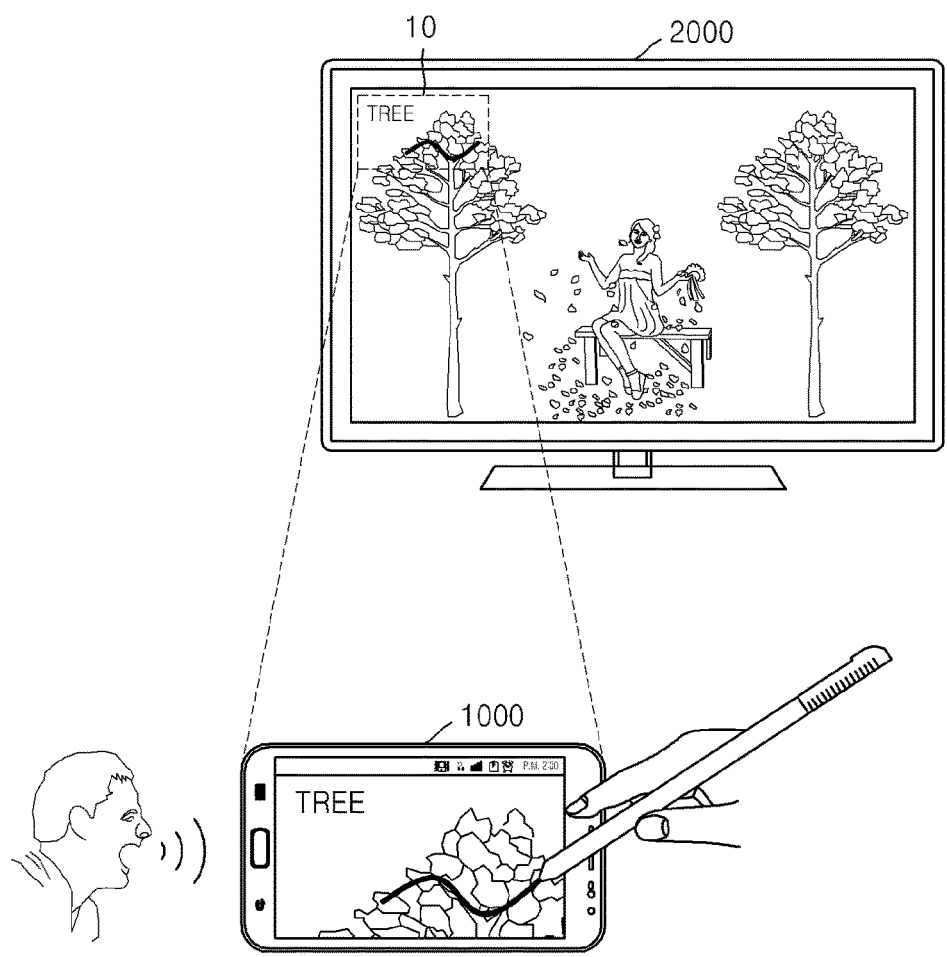
FIG. 1 illustrates an example of displaying content shared between a display apparatus and a device according to an exemplary embodiment.

Hereinafter, exemplary embodiments will now be described more fully with reference to the accompanying drawings. The exemplary embodiments may, however, be embodied in many different forms and should not be construed as being limited to the exemplary embodiments set forth herein; rather, these exemplary embodiments are provided so that this disclosure will be thorough and complete, and will fully convey the concept of the inventive concept to those of ordinary skill in the art. In the following description, well-known functions or constructions are not described in detail so as not to obscure the exemplary embodiments with unnecessary detail. Throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. When a part "includes" or "comprises" an element, unless there is a particular description contrary thereto, the part can further include other elements, not excluding the other elements.

In the specification, content means an object such as a moving picture, a still image, a text, or the like which may be displayed on screens of a device and a display apparatus. The fact that a partial region of the content is displayed means that a partial region of an output image of the content is displayed.

Expressions such as "at least one of," when preceding a list of elements, modify the entire list of elements and do not modify the individual elements of the list.

FIG. 1 illustrates an example of displaying content shared between a display apparatus 2000 and a device 1000 according to an exemplary embodiment.

Referring to FIG. 1, the content may be displayed on the display apparatus 2000, and a partial region 10 of the content that is displayed on the display apparatus 2000 may be displayed on the device 1000. The display apparatus 2000 may exist outside the device 1000.

The display apparatus 2000 may mark content of the partial region, which is displayed on the device 1000, on the content that is displayed on the display apparatus 2000.

A user may edit the content of the partial region displayed on a screen of the device 1000, by using an input instrument such as a stylus pen, and the display apparatus 2000 may receive edited information from the device 1000, may apply the edited information to the content and may display the content. However, one or more exemplary embodiments are not limited thereto, thus, the user may edit the content of the partial region displayed on the screen of the device 1000, by using a voice command.

The device 1000 may execute a predetermined application installed in the device 1000 and then may receive, display, and edit the content displayed on the display apparatus 2000 via the executed application. In this case, the device 1000 may execute the application installed in the device 1000, based on a user input, but the execution method is not limited thereto. When the device 1000 approaches within a preset range from the display apparatus 2000, the device 1000 may execute the application installed in the device 1000.

The device 1000 may select one of service providing lists about content sharing services provided to the display apparatus 2000 and another device (not shown) and thus may receive, display, and edit the content displayed on the display apparatus 2000.

The display apparatus 2000 may include, but is not limited to, a digital TV, a kiosk, a smart phone, a mobile phone, a personal digital assistant (PDA), a laptop computer, a media player, a global positioning system (GPS) apparatus, and other mobile or non-mobile computing devices. The display apparatus 2000 may include various apparatuses such as an electronic board, a touch table, or the like which may receive a touch input.

The device 1000 may include, but is not limited to, a smart phone, a mobile phone, a PDA, a laptop computer, a media player, a GPS apparatus, and other mobile or non-mobile computing devices.

Figure 2:
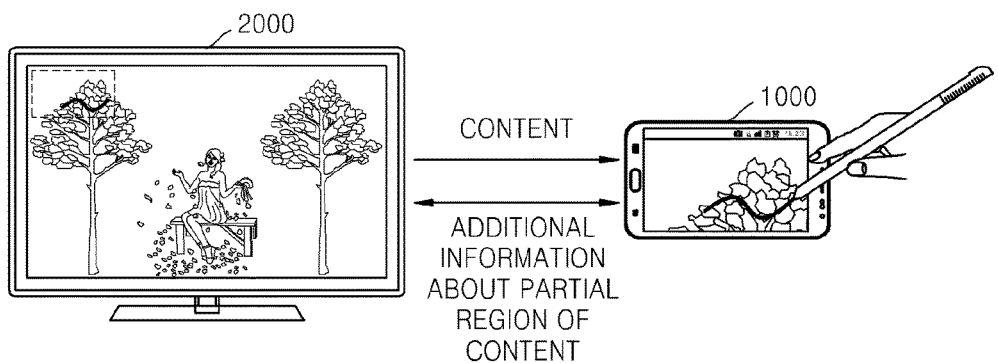
FIG. 2 illustrates an example in which the device displays a partial region of content displayed on the display apparatus, and exchanges the content and additional information about the partial region of the content with the display apparatus, according to an exemplary embodiment.

FIG. 2 illustrates an example in which the device 1000 displays a partial region of content displayed on the display apparatus 2000, and exchanges the content and additional information about the partial region of the content with the display apparatus 2000, according to an exemplary embodiment.

Referring to FIG. 2, the display apparatus 2000 and the device 1000 may share and display content without a separate server (not shown). The display apparatus 2000 may provide content displayed on the display apparatus 2000 to the device 1000, and the device 1000 may display a partial region of the received content on a screen of the device 1000. The device 1000 may provide additional information about the partial region to the display apparatus 2000, so that the partial region of the content displayed on the device 1000 and edition features about the partial region may be applied to the content that is displayed on the display apparatus 2000.

The device 1000 may provide region information about the partial region and edition information about the partial region to the display apparatus 2000, and the display apparatus 2000 may mark a region, which corresponds to the partial region of the content displayed on the device 1000, on the content, may apply the edition features by the device 1000 to the content, and then may display the content.

Figure 3:
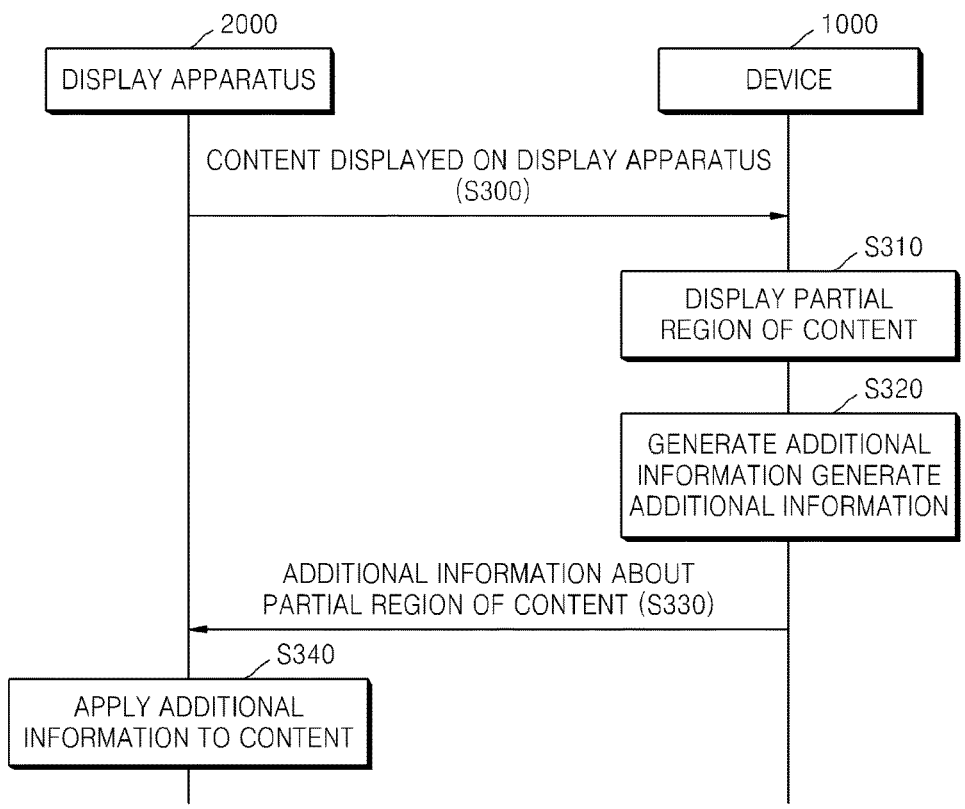
FIG. 3 is a flowchart of a method of displaying, by the display apparatus and the device, content that is shared between the display apparatus and the device, according to an exemplary embodiment.

FIG. 3 is a flowchart of a method of displaying, by the display apparatus 2000 and the device 1000, content that is shared between the display apparatus 2000 and the device 1000, according to an exemplary embodiment.

In operation S300, the display apparatus 2000 provides content displayed on the display apparatus 2000 to the device 1000. The display apparatus 2000 may provide a file of the content displayed on the display apparatus 2000 to the device 1000. Alternatively, the display apparatus 2000 may provide link information for a download of the content to the device 1000. For example, the content may include, but is not limited to, a moving picture, a still image, and a text. For example, the content may include, but is not limited to, an image captured by using a camera, a captured-image, a picture image, a map image, a subway map image, a bus map image, Electronic Program Guide (EPG) information, a content browsing screen, an application browsing screen, a webpage, an execution screen of a word processor program, and a broadcasting image.

In operation S300, the display apparatus 2000 provides the share target content to the device 1000, but in another embodiment, the device 1000 may provide share target content to the display apparatus 2000.

In operation S310, the device 1000 displays a partial region of the received content. In operation S310, the device 1000 may display only the partial region of the received content, but one or more exemplary embodiments are not limited thereto. That is, when the device 1000 receives the content, the device 1000 may display a preset region of the content on a screen of the device 1000. In this case, the device 1000 may previously receive information about the preset region from the display apparatus 2000. The information about the preset region, for example, may include information about which region of the content displayed on the display apparatus 2000 is to be displayed by the device 1000, information about which resolution is to be used for the device 1000 to display the partial region of the content, or the like.

The preset region may be pre-determined by the display apparatus 2000 or the device 1000, based on the display resolution of the device 1000 and the resolution of the content, and the device 1000 may check the resolution of the received content and then may determine a display target region of the content.

The device 1000 may display the partial region of the content, based on a user input. In this case, the device 1000 may display an entire region of the received content on the screen, and may select a partial region of the content in response to a user input with respect to the entire region of the content displayed on the screen. The device 1000 may also display the selected partial region on an entire portion of the screen of the device 1000.

The device 1000 may display information about the partial region of the content displayed on the screen. In this case, the information about the partial region of the content may be received from a separate server (not shown). For example, the information about the partial region of the content may include, but is not limited to, product information about an object (e.g., clothes) that is included in the partial region of the content.

The device 1000 may change and display the partial region of the content, based on a user input. In more detail, the device 1000 may move the partial region of the content to another partial region of an entire region of the content, based on the user input, and may display it. The device 1000 may enlarge or reduce the partial region of the content, based on a user input. A method of displaying, by the device 1000, the partial region of the content will be described in detail with reference to FIG. 4.

In operation S320, the device 1000 generates additional information about the partial region of the content. The additional information may include region information about the partial region of the content and edition information about the partial region of the content. The region information may indicate in which region of the entire region that the partial region of the content displayed on the screen is positioned, and for example, may include coordinate information. The edition information may be information related to edition with respect to the partial region of the content that is displayed on the screen of the device 1000, and for example, may include information about a line, a figure, and a color which are changed with respect to the partial region. The edition information may include an image, a text, a voice command, and a control command for edition. A method of generating, by the device 1000, the additional information about the partial region of the content will be described in detail with reference to FIG. 5.

The additional information may include a control command to control the display apparatus 2000. For example, when a program list is displayed on the display apparatus 2000, the device 1000 may generate a control command as the additional information to reproduce a predetermined program.

In operation S330, the device 1000 provides the generated additional information to the display apparatus 2000. The device 1000 may directly provide the additional information to the display apparatus 2000, but one or more exemplary embodiments are not limited thereto. The device 1000 may provide the additional information to the display apparatus 2000 via a separate server (not shown). In this case, the additional information may be stored in the server.

In operation S340, the display apparatus 2000 marks the content according to the additional information corresponding to the content. Based on the region information received from the device 1000, the display apparatus 2000 may mark a region corresponding to the partial region that is displayed on the device 1000 to allow the region to differ in the entire region of the content displayed on the display apparatus 2000. For example, the display apparatus 2000 may mark the region corresponding to the partial region that is displayed on the device 1000, by using an outline having a predetermined color and pattern. If one or more devices display the partial region of the content that is displayed on the display apparatus 2000, the display apparatus 2000 may mark regions that are displayed in the one or more devices, respectively, on the content displayed on the display apparatus 2000, by using outlines having distinguishable colors and patterns that respectively represent the one or more devices.

The display apparatus 2000 may apply edition features by the device 1000 to the content that is displayed on the display apparatus 2000, based on the edition information received from the device 1000, and may display the content.

In the exemplary embodiment of FIG. 3, the device 1000 provides the additional information about the partial region of the content to the display apparatus 2000, and the display apparatus 2000 applies the additional information to the content that is displayed on the display apparatus 2000, but one or more exemplary embodiments are not limited thereto. That is, the device 1000 may display and change a partial region of content, and may provide only the content of the displayed partial region or content of the changed partial region to the display apparatus 2000. The device 1000 may also provide entire content including the changed partial region to the display apparatus 2000. In this case, the device 1000 may apply additional information including edition information and coordinate information to the content by performing predetermined image processing. The display apparatus 2000 may receive the content having the edition information applied thereto from the device 1000 and may display the content.

Figure 4:
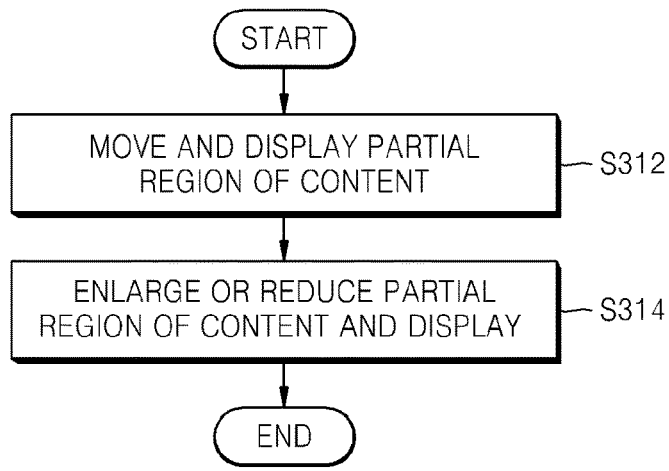
FIG. 4 is a flowchart of a method of displaying, by the device, the partial region of the content in operation S310 of the flowchart of FIG. 3, according to an exemplary embodiment.

FIG. 4 is a flowchart of a method of displaying, by the device 1000, the partial region of the content in operation S310 of the flowchart of FIG. 3, according to an exemplary embodiment.

In operation S312, the device 1000 moves and displays the partial region of the content. The device 1000 may move the partial region of the content to another partial region of the entire region of the content, and then may display the partial region after the movement on a screen of the device 1000.

The device 1000 may detect movement of the device 1000 and may determine in which direction the partial region of the content is moved, according to the movement of the device 1000. For example, when a user moves the device 1000 to the right, the device 1000 may move the partial region of the content in to the right. The device 1000 may detect a movement distance of the device 1000, and may move the partial region of the content on the content by a preset value based on the movement distance of the device 1000. In this case, the device may detect the movement of the device 1000 by using, but is not limited to, a gyro sensor, an acceleration sensor, or a gravity sensor.

The device 1000 may move the partial region of the content, in response to a touch input by a user. For example, when the user touches the partial region of the content displayed on the screen of the device 1000, and drags the partial region in a right direction, the device 1000 may move the partial region of the content in a right direction. According to another example, when the user inputs a downward swipe input with respect to the partial region of the content displayed on the screen of the device 1000, the device 1000 may move the partial region of the content in a downward direction.

When the device 1000 moves the partial region of the content, the device 1000 may provide region information about the moved partial region of the content to the display apparatus 2000. By doing so, the display apparatus 2000 may mark a region, which corresponds to the partial region moved by the device 1000, on the content displayed on the display apparatus 2000.

In operation S314, the device 1000 enlarges or reduces and then displays content of the partial region.

The device 1000 may detect the movement of the device 1000, and may determine whether to enlarge or reduce the partial region of the content according to the movement of the device 1000. For example, when the user moves the device in a forward direction from a front of the screen of the device 1000, the device 1000 may enlarge the partial region of the content. According to another example, when the user moves the device in a backward direction with respect to a front of the screen of the device 1000, the device 1000 may reduce the partial region of the content. The device 1000 may detect a movement distance of the device 1000, and may move the partial region of the content on the content by a preset value based on the movement distance of the device 1000. In this case, the device may detect the movement of the device 1000 by using, but is not limited to, a gyro sensor, an acceleration sensor, or a gravity sensor.

The device 1000 may enlarge or reduce the partial region of the content, based on a touch input by a user. For example, the device 1000 may enlarge the partial region of the content, based on an unpinching input by the user. According to another example, the device 1000 may reduce the partial region of the content, based on a pinching input by the user.

After the device 1000 enlarges or reduces the partial region of the content, the device 1000 may provide region information about the enlarged or reduced partial region to the display apparatus 2000. By doing so, the display apparatus 2000 may mark a region, which corresponds to the partial region that is enlarged or reduced by the device 1000, on the content that is displayed on the display apparatus 2000.

When the device 1000 enlarges and displays the partial region of the content, the device 1000 may receive a high image-quality file with respect to the partial region of the content. The high image-quality file with respect to the partial region of the content may be transmitted from the display apparatus 2000 or a separate server (not shown). In this case, the device 1000 may provide coordinate information of the partial region, which is displayed on the device 1000, to the display apparatus 2000, and may receive high image-quality content with respect to the partial region, which is displayed on the device 1000, from the display apparatus 2000. The device 1000 may provide coordinate information of the partial region, which is displayed on the device 1000, to a server 3000 (refer to FIG. 9) that is connected with the display apparatus 2000 and the device 1000, and may receive high image-quality content with respect to the partial region, which is displayed on the device 1000, from the server 3000.

However, one or more exemplary embodiments are not limited thereto, thus, when the device 1000 enlarges and displays the partial region of the content, the device 1000 may perform image processing on the partial region of the content into a high image-quality image and may display the partial region.

Figure 5:
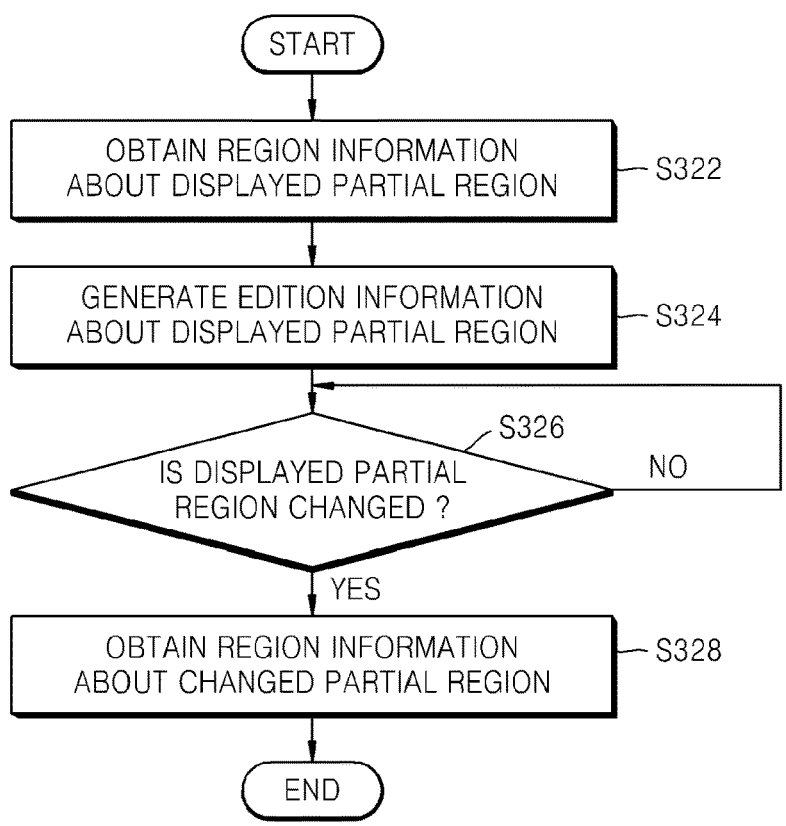
FIG. 5 is a flowchart of a method of generating, by the device, the additional information about the partial region of the content in operation S320 of the flowchart of FIG. 3, according to an exemplary embodiment.

FIG. 5 is a flowchart of a method of generating, by the device 1000, the additional information about the partial region of the content in operation S320 of the flowchart of FIG. 3, according to an exemplary embodiment.

In operation S322, the device 1000 obtains region information about the displayed partial region. The device 1000 may obtain region information about which region of an entire region that the content displayed on the screen of the device 1000 is positioned. For example, the device 1000 may obtain a coordinate value of the partial region of the content.

In operation S324, the device 1000 generates edition information about the displayed partial region. In operation S324, the device 1000 may edit the displayed partial region, in response to a user input, and may generate information about edition features. For example, the device 1000 may cut, copy, and paste a part of the partial region of the content. According to another example, the device 1000 may add or remove a line, a figure, and a color from the partial region of the content. In this case, a user may add to or remove the line, the figure, and the color from the partial region of the content, by touching or dragging the screen of the device 1000 by using an input instrument such as a stylus. According to yet another example, the device 1000 may also change a line, a figure, and a color of the partial region of the content. In another example, the device 1000 may change brightness and chroma of the partial region of the content.

In this case, a user interface (UI) for edition with respect to the partial region of the content may be output to the screen of the device 1000. The UI, for example, may include a UI that allows the user to change the brightness and the chroma. The UI may also include a UI that allows the user to select, cut, copy, and paste a predetermined part. The UI may also provide a UI that allows the user to add a sticker image to the partial region of the content and then to display the partial region of the content. The UI may also include a UI that allows the user to draw a line or a figure on the partial region of the content by using a user's hand or the stylus.

The edition information may correspond to a voice command of the user to edit the partial region of the content. The device 1000 may provide a user's voice command to the display apparatus 2000, and the display apparatus 2000 may analyze the user's voice command received from the device 1000 and then may edit the partial region of the content. In this case, the display apparatus 2000 may store a control command for edition, and the control command may match with the user's voice command. The display apparatus 2000 may edit the partial region of the content according to the user's voice command, by using the stored control command.

The device 1000 may generate edition information based on a user's voice command. The device 1000 may convert the user's voice command into a text and may provide the text to the display apparatus 2000. For example, when a user says "tree", the device 1000 may generate a text (i.e., tree) from the user's voice command and may provide the generated text (i.e., tree) to the display apparatus 2000. The device 1000 may generate a control command as edition information based on a user's voice command, wherein the control command is used in a edition of to the partial region of the content. For example, when a user says "increase brightness", the device 1000 may analyze the user's voice command, may generate a control command to increase brightness of the partial region of the content, and may provide the control command to the display apparatus 2000.

In operation S326, the device 1000 determines whether the displayed partial region is changed. The device 1000 may determine whether content of the displayed partial region is moved to another region in an entire region of the content, is enlarged, or is reduced.

In operation S328, the device 1000 obtains region information about a changed partial region. The device 1000 may obtain the region information about which position in the entire region of the content that the partial region displayed on the screen of the device 1000 is moved. The device 1000 may obtain region information about in which region of the entire region of the content that the partial region is positioned after the partial region is enlarged or reduced on the screen of the device 1000. For example, the device 1000 may obtain a coordinate value with respect to the changed partial region.

Figure 6:
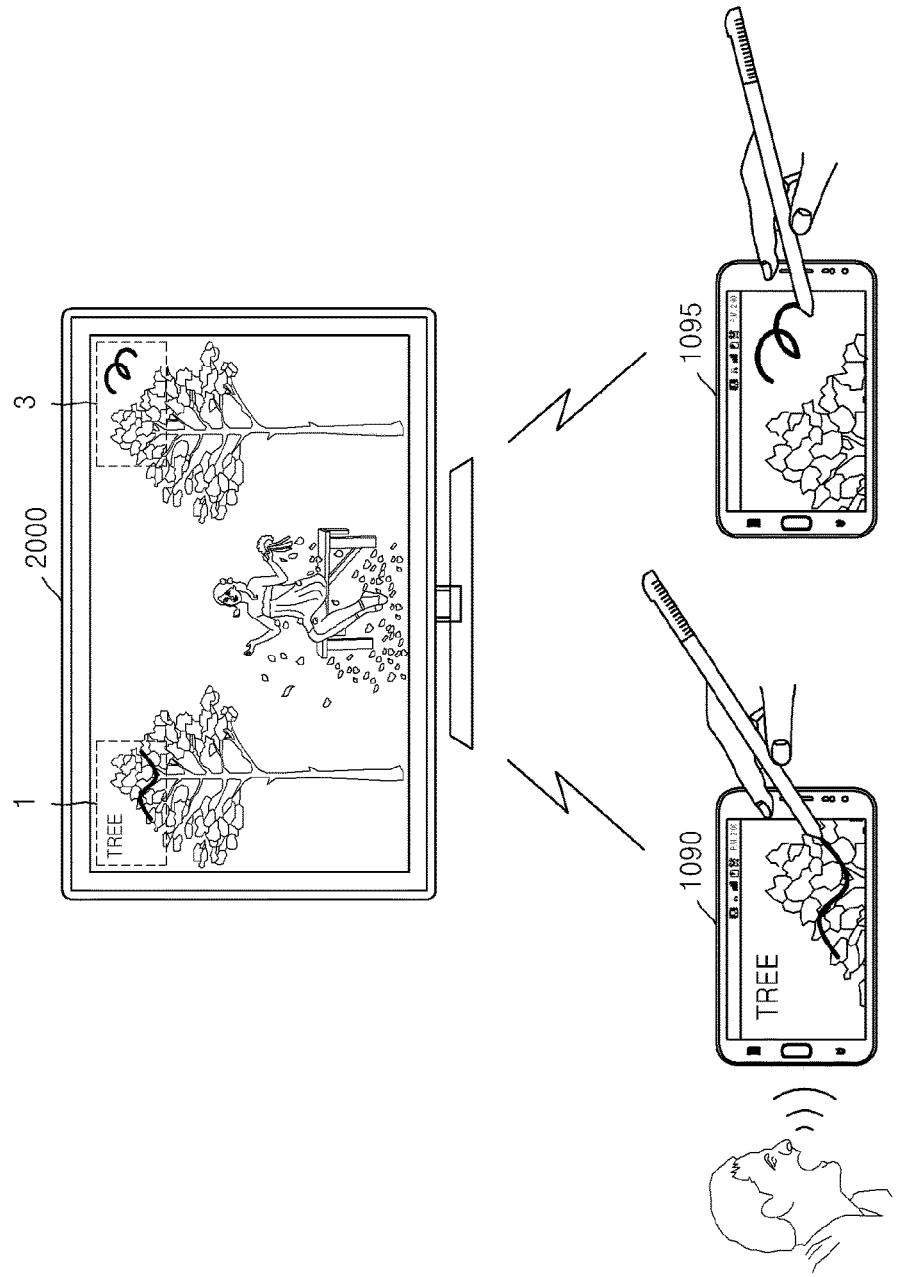
FIG. 6 illustrates an example in which partial regions of content that are displayed on the display apparatus are displayed on a plurality of devices, respectively, and edition information generated in each of the devices is displayed on the display apparatus, according to an exemplary embodiment.

FIG. 6 illustrates an example in which partial regions of content that is displayed on the display apparatus 2000 are displayed on a plurality of devices 1090 and 1095, respectively, and edition information generated in each of the devices 1090 and 1095 is displayed on the display apparatus 2000, according to an exemplary embodiment.

Referring to FIG. 6, the partial regions of the content that is displayed on the display apparatus 2000 may be displayed on the devices 1090 and 1095, respectively. The device 1090 may edit content of the partial region displayed on the device 1090, based on a user input received by using a stylus. The device 1095 may edit content of the partial region displayed on the device 1095, based on a user input received by using a stylus.

The display apparatus 2000 may receive edition information, which is generated in the device 1090, from the device 1090 and may apply the edition information to the content displayed on the display apparatus 2000. The display apparatus 2000 may also receive edition information, which is generated in the device 1095, from the device 1095 and may apply the edition information to the content displayed on the display apparatus 2000.

The display apparatus 2000 may mark a region corresponding to the content of the partial region that is displayed on a screen of the device 1090, by using an outline 1. The display apparatus 2000 may mark a region corresponding to the content of the partial region that is displayed on a screen of the device 1095, by using an outline 3. In this case, the display apparatus 2000 may distinguish between the regions of the device 1090 and the device 1095 by differently marking at least one of a color and a pattern of the outline 1 and the outline 3. The display apparatus 2000 may display an identification (ID) value of the device 1090 at a region adjacent to the outline 1, and may display an ID value of the device 1095 at a region adjacent to the outline 3.

The device 1090 may generate edition information based on a user's voice command and may provide the edition information to the display apparatus 2000. For example, when a user says "tree", the device 1090 may convert the user's voice command into a text (i.e., tree). Then, the device 1090 may provide the text (i.e., tree) to the display apparatus 2000, and the display apparatus 2000 may insert 'tree' into a predetermined region within the outline 1.

The edition information generated by each of the devices 1090 and 1095 may be applied to the content, and may be stored in at least one of the display apparatus 2000 and a separate server (not shown). At a later time, the content having the edition information applied thereto may be provided to the devices 1090 and 1095.

In the exemplary embodiment of FIG. 6, the device 1090, the device 1095, and the display apparatus 2000 may exist within a home network, but one or more exemplary embodiments are not limited thereto. That is, at least one of the device 1090, the device 1095, and the display apparatus 2000 may exist outside the home network. In this case, devices in the home network may exchange data with each other via local communication and may exchange data with a device outside the home network via a wide area network.

Figure 7:
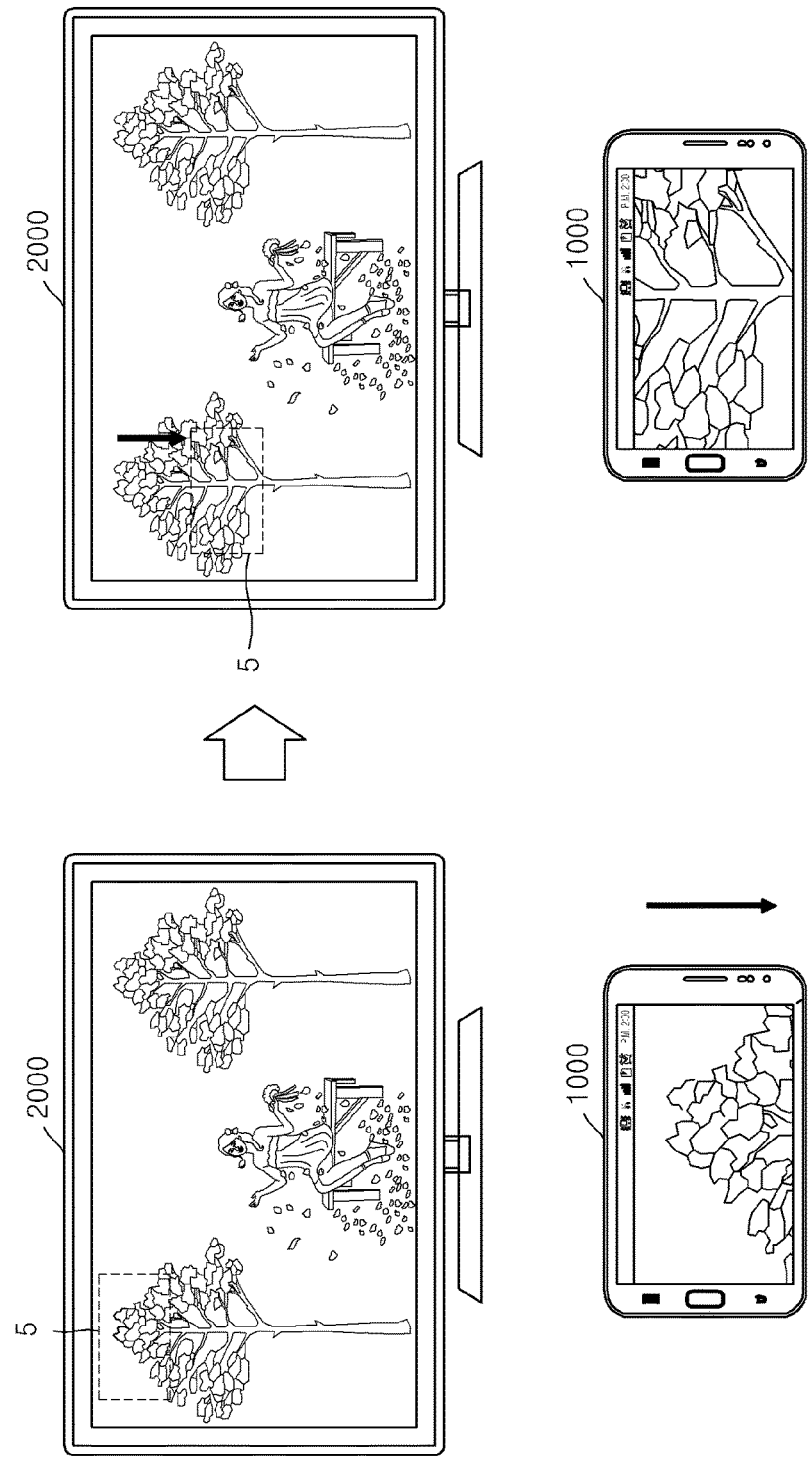
FIG. 7 illustrates an example in which a partial region of content displayed on the device is moved and is displayed according to a movement of the device, according to an exemplary embodiment.

FIG. 7 illustrates an example in which a partial region of content displayed on the device 1000 is moved and is displayed according to a movement of the device 1000, according to an exemplary embodiment.

Referring to FIG. 7, the display apparatus 2000 may mark a region, which corresponds to content of the partial region displayed on the device 1000, on content that is displayed on the display apparatus 2000, by using an outline 5. When a user moves the device 1000 in a downward direction, the device 1000 may detect the movement of the device 1000, and may move the partial region of the content displayed on the device 1000, based on a movement distance of the device 1000. In this case, the device 1000 may provide region information about the moved partial region to the display apparatus 2000, and the display apparatus 2000 may move the outline 5 and then may mark a region corresponding to the moved partial region displayed on the device 1000.

In the exemplary embodiment of FIG. 7, the partial region of the content displayed on the device 1000 is moved based on the movement distance of the device 1000, but one or more exemplary embodiments are not limited thereto. That is, the partial region of the content displayed on the device 1000 may be moved based on a user's touch input to a screen of the device 1000.

Figure 8:
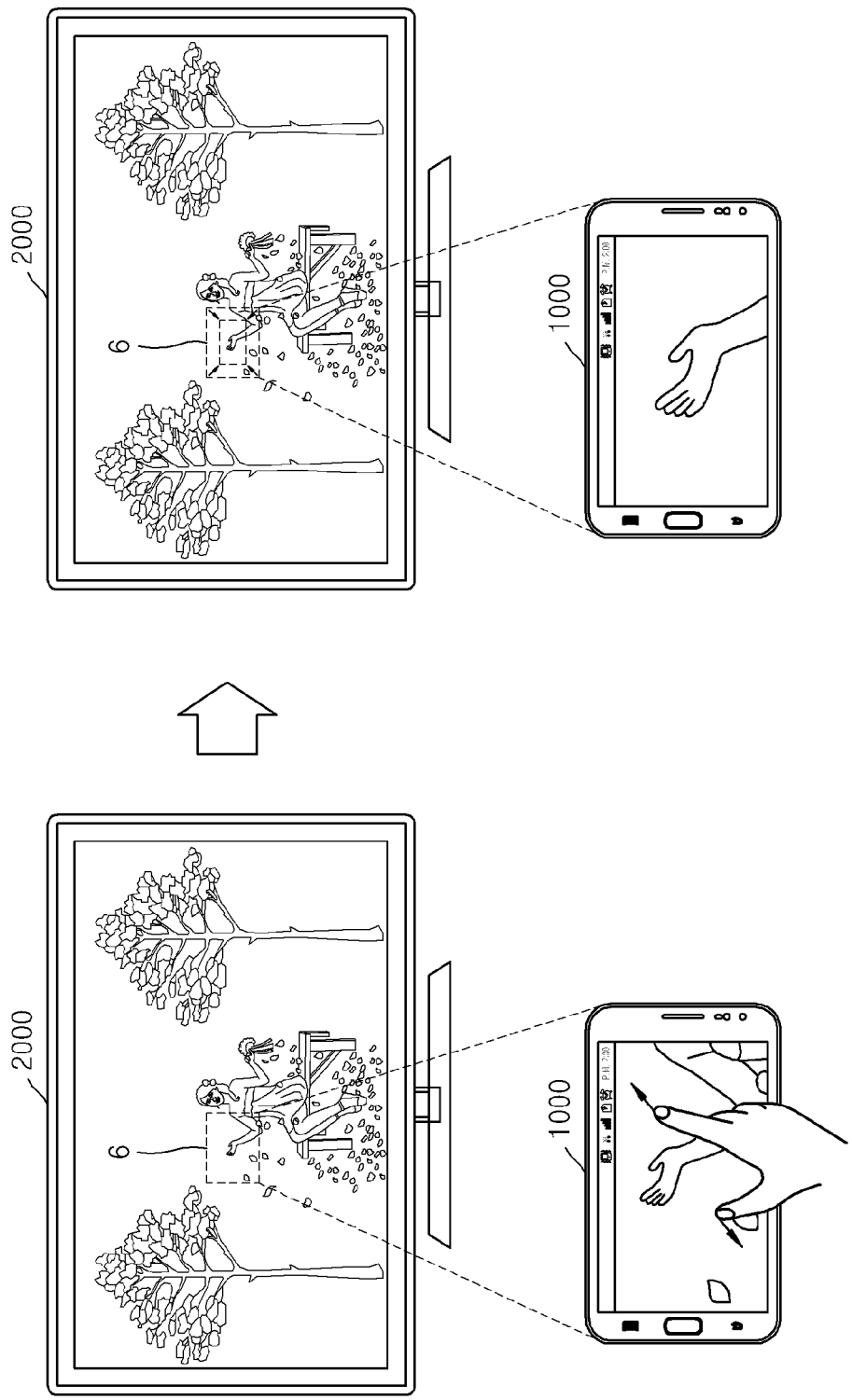
FIG. 8 illustrates an example in which a partial region of content displayed on the display apparatus is enlarged and is displayed on the device, according to an exemplary embodiment.

FIG. 8 illustrates an example in which a partial region 6 of content displayed on the display apparatus 2000 is enlarged and is displayed on the device 1000, according to an exemplary embodiment.

Referring to FIG. 8, an image that corresponds to the partial region 6 of the content displayed on the display apparatus 2000 may be displayed on a screen of the device 1000. The device 1000 may enlarge or reduce an image displayed on the screen, in response to a user input. For example, the device 1000 may enlarge the image displayed on the screen, based on an unpinching input by a user. After the device 1000 enlarges the image, the device may provide region information about the enlarged image displayed on the screen to the display apparatus 2000. The display apparatus 2000 may receive the region information about the image that is enlarged on the screen of the device 1000, may apply the region information to the content displayed on the display apparatus 2000, and then may reduce an outline of the partial region 6.

Figure 9:
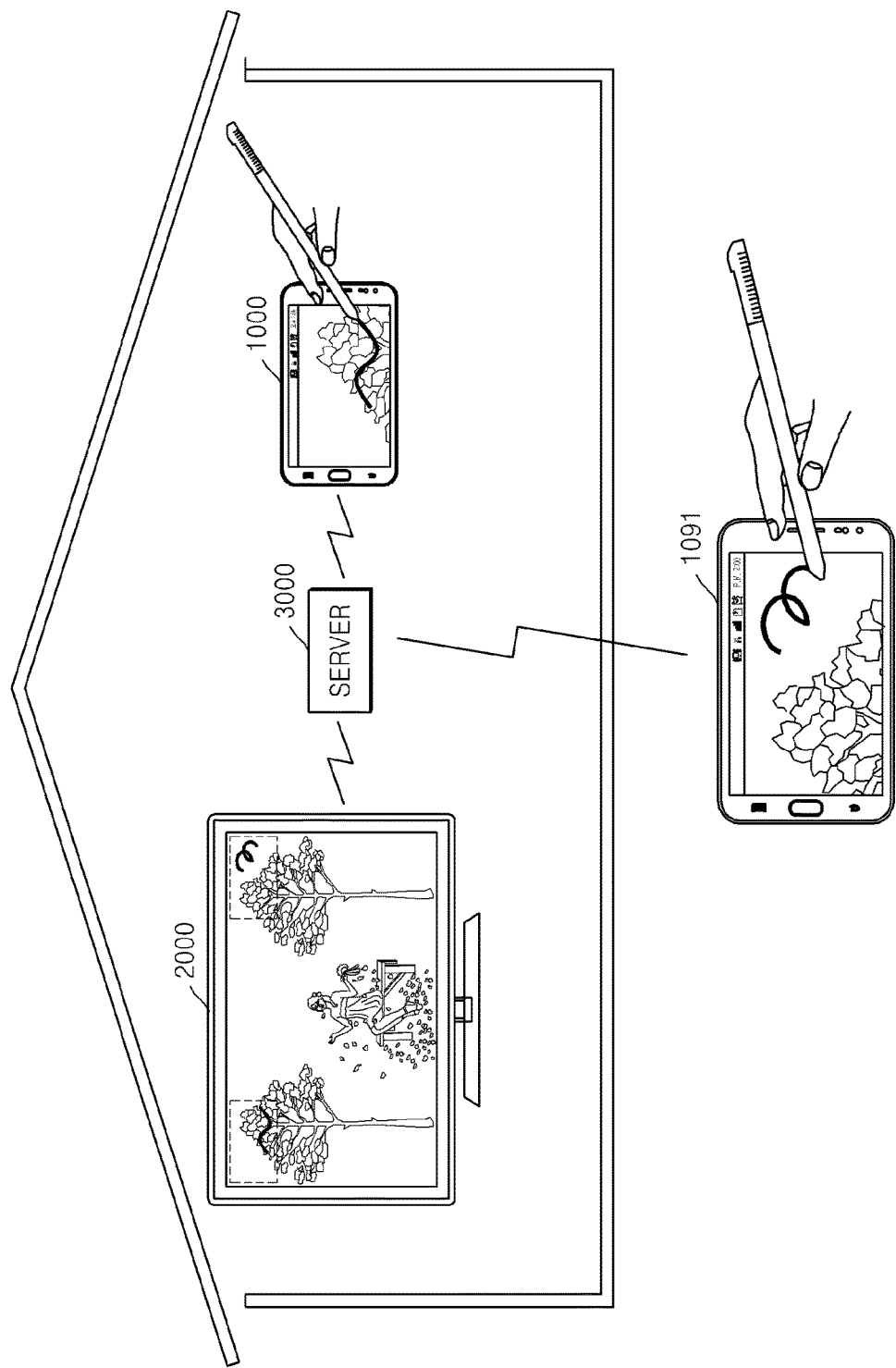
FIG. 9 illustrates an example in which content and additional information about a partial region of the content are displayed while shared between the device and the display apparatus via a server, according to an exemplary embodiment.

FIG. 9 illustrates an example in which content and additional information about a partial region of the content are displayed while shared between the device 1000 and the display apparatus 2000 via a server 3000, according to an exemplary embodiment.

Referring to FIG. 9, the display apparatus 2000 and the device 1000 may share the content via the server 3000 and display the content. The server 3000 may provide the content to be shared between the device 1000 and the display apparatus 2000 to the display apparatus 2000 and the device 1000, and each of the display apparatus 2000 and the device 1000 may display the content on their respective screens. The server 3000 may be positioned in or outside a home network. When the server 3000 is positioned in the home network, the server 3000 may be, but is not limited to, a gateway apparatus. The device 1000 may display a partial region of the content, may generate additional information about the partial region, and may provide the additional information to the display apparatus 2000 via the server 3000. In more detail, the device 1000 may provide region information about the partial region and edition information about the partial region to the display apparatus 2000 via the server 3000, and the display apparatus 2000 may mark a region, which corresponds to the partial region of the content displayed on the device 1000, on the content by using the region information and the edition information, may apply edition features by the device 1000 to the content, and then may display the content. However, one or more exemplary embodiments are not limited thereto, and thus, the server 3000 may edit the content shared between the device 1000 and the display apparatus 2000, based on the additional information from the device 1000, and may provide the edited content to the display apparatus 2000.

A device 1091 may be connected to the display apparatus 2000 via the server 3000. In this case, the display apparatus 2000 and the device 1000 may be positioned in the home network, and the device 1091 may be positioned outside the home network, but one or more exemplary embodiments are not limited thereto.

Figure 10:
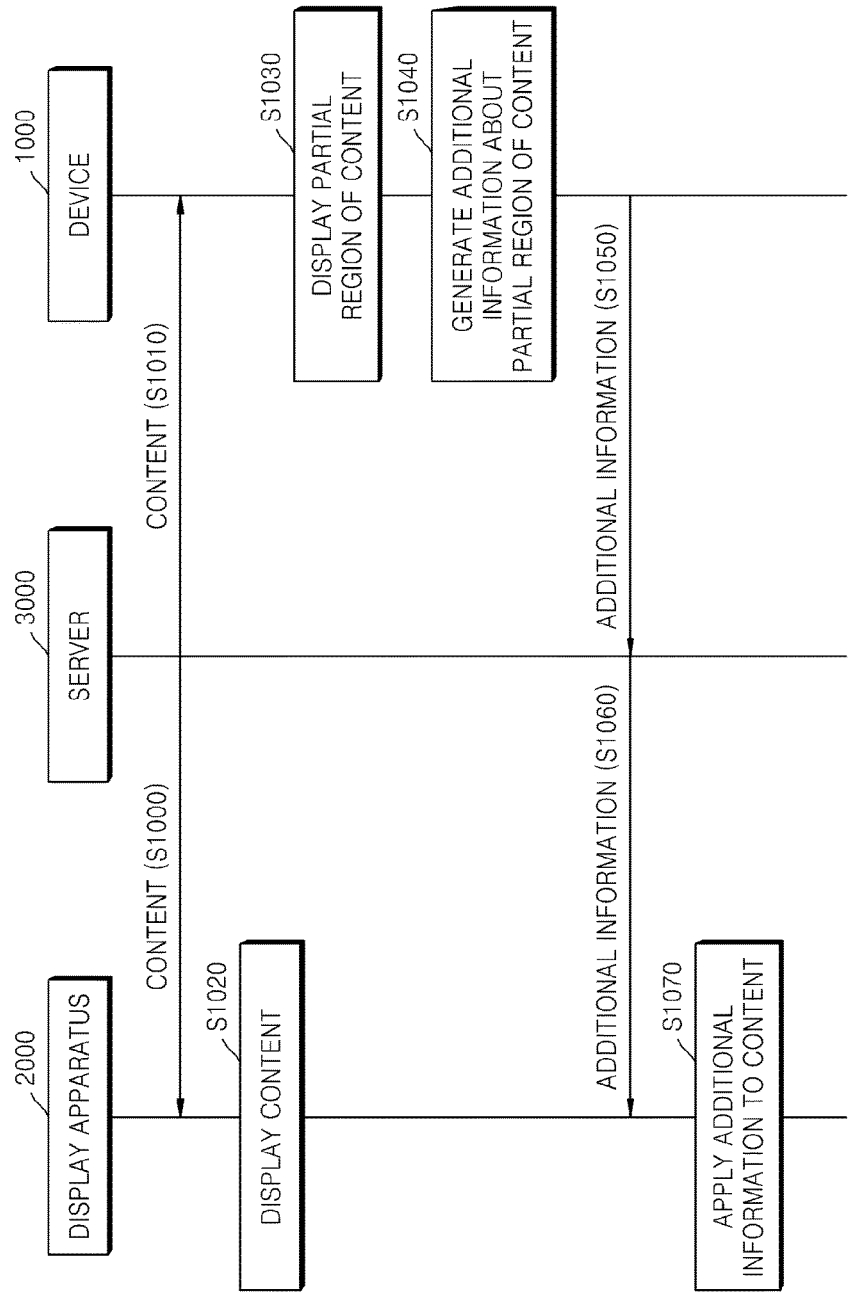
FIG. 10 is a flowchart of a method of displaying, by the display apparatus and the device, shared content via the server, according to an exemplary embodiment.

FIG. 10 is a flowchart of a method of displaying, by the display apparatus 2000 and the device 1000, shared content via the server 3000, according to an exemplary embodiment. In the flowchart of FIG. 10, the server 3000 may provide additional information from the device 1000 to the display apparatus 2000, and the display apparatus 2000 may apply the additional information to the content and may display the content.

In operations S1000 and S1010, the server 3000 provides content to the display apparatus 2000 and the device 1000. The server 3000 may provide the content to be shared between the display apparatus 2000 and the device 1000 to at least one of the display apparatus 2000 and the device 1000. The content may include, but is not limited to, a moving picture, a still image, and a text.

The content provided by the server 3000 may be content that is stored in the display apparatus 2000. In this case, the server 3000 may receive the content from the display apparatus 2000 and may provide the received content to the device 1000. The content provided by the server 3000 may be content that is stored in the device 1000. In this case, the server 3000 may receive the content from the device 1000 and may provide the received content to the display apparatus 2000.

In operation S1020, the display apparatus 2000 displays the content. The display apparatus 2000 may display an entire region of the content on a screen. For example, when the display apparatus 2000 receives a photo image, the display apparatus 2000 may display an entire region of the photo image on the screen. For example, when the display apparatus 2000 receives a document file, the display apparatus 2000 may display an entire region of one or more predetermined pages of the document file on the screen.

In operation S1030, the device 1000 displays a partial region of the content. Since the device 1000 receives the content, the device 1000 may display a preset region of the content on the screen. In this case, the device 1000 may receive information about the preset region from the display apparatus 2000 or the server 3000. For example, the information about the preset region may include information indicating which region of the content displayed on the display apparatus 2000 that the device 1000 has to display, information indicating which resolution is used when the device 1000 displays the partial region of the content, or the like.

The preset region may be previously set by the display apparatus 2000, the device 1000, or the server 3000, based on resolution of the device 1000 and resolution of the content. The device 1000 may check the resolution of the content and may determine a display target region of the content.

The device 1000 may display the partial region of the content based on a user input. In this case, the device 1000 may display an entire region of the content on the screen, and may select the partial region of the content based on the user input with respect to the entire region of the content on the screen. The device 1000 may display the selected partial region on an entire portion of the screen of the device 1000.

The device 1000 may change a partial region of the content based on a user input and may display the partial region. In more detail, the device 1000 may move the partial region of the content to another partial region of the entire region of the content, based on the user input, and may display it. The device 1000 may enlarge or reduce the partial region of the content, based on a user input.

In operation S1040, the device 1000 generates additional information about the partial region of the content. The additional information may include region information about the partial region and edition information about the partial region. The region information may indicate in which region of the entire region that the partial region of the content displayed on the screen of the device 1000 is positioned, and for example, may include coordinate information. The edition information may be information related to user's edition with respect to the partial region of the content that is displayed on the screen of the device 1000, and for example, may include information about a line, a figure, and a color which are changed with respect to the partial region.

In operation S1050, the device 1000 provides the additional information to the server 3000. In this case, the device 1000 may also provide an ID value of the display apparatus 2000, which is to receive the additional information, to the server 3000. The additional information that is provided in operation S1050 may be stored in the server 3000.

In operation S1060, the server 3000 provides the additional information to the display apparatus 2000. The server 3000 may provide the additional information to the display apparatus 2000, based on the ID value of the display apparatus 2000 which is received from the device 1000.

In operations S1050 and S1060, the device 1000 provides the additional information to the display apparatus 2000 via the server 3000, but one or more exemplary embodiments are not limited thereto. The device 1000 may directly provide the additional information to the display apparatus 2000.

In operation S1070, the display apparatus 2000 applies the received additional information to the content and displays the content. Based on the region information received from the server 3000, the display apparatus 2000 may mark a region corresponding to the partial region that is displayed on the device 1000 to allow the region to differ or be distinguished from the entire region of the content displayed on the display apparatus 2000. For example, the display apparatus 2000 may mark the region corresponding to the partial region that is displayed on the device 1000, by using an outline having a predetermined color and pattern. If one or more devices display the partial region of the content that is displayed on the display apparatus 2000, the display apparatus 2000 may mark regions that are displayed in the one or more devices, respectively, on the content displayed on the display apparatus 2000, by using outlines having colors and patterns that are distinguishable from each other and respectively correspond to the one or more devices.

The display apparatus 2000 may apply edition features by the device 1000 to the content that is displayed on the display apparatus 2000, based on the edition information received from the server 3000, and may display the content.

Figure 11:
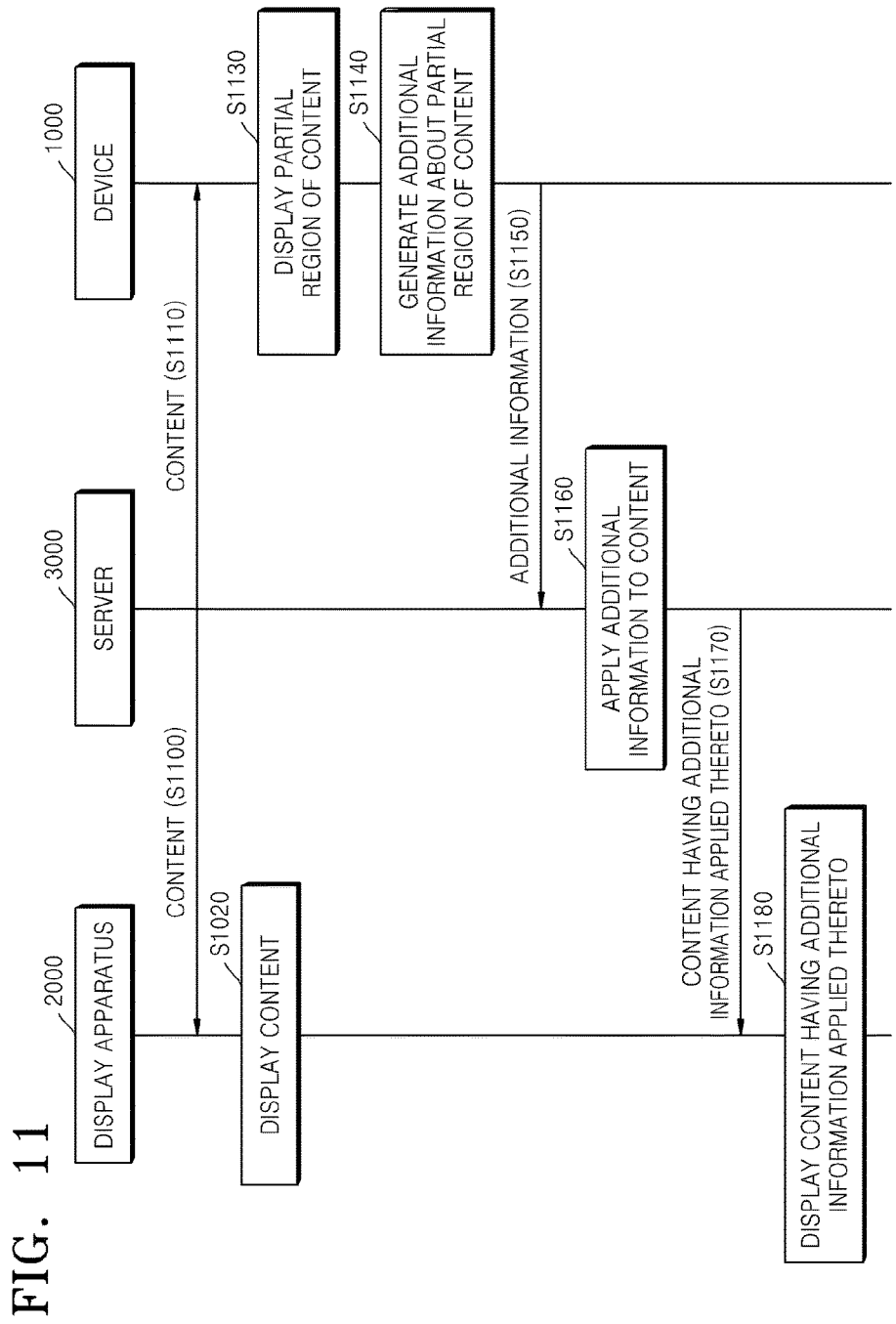
FIG. 11 is a flowchart of a method of displaying, by the display apparatus and the device via the server, content that is shared between the display apparatus and the device, according to an exemplary embodiment.

FIG. 11 is a flowchart of a method of displaying, by the display apparatus 2000 and the device 1000 via the server 3000, content that is shared between the display apparatus 2000 and the device 1000, according to an exemplary embodiment. In the flowchart of FIG. 11, the server 3000 may apply additional information from the device 1000 to content, and may provide the content having the additional information applied thereto to the display apparatus 2000. Since operations S1100 through S1150 of the flowchart of FIG. 11 correspond to operations S1000 through S1050 of the flowchart of FIG. 10, descriptions with respect to operations S1100 through S1150 are omitted here.

In operation S1160, the server 3000 applies the additional information, which is received from the device 1000, to the content. Based on region information received from the device 1000, the server 3000 may mark a region corresponding to a partial region that is displayed on the device 1000 to allow the region to be distinguishable from other regions in an entire region of the content. For example, the server 3000 may mark the region corresponding to the partial region that is displayed on the device 1000, by using an outline having a predetermined color and pattern. If one or more devices display the partial region of the content that is displayed on the display apparatus 2000, the server 3000 may mark regions that are displayed in the one or more devices, respectively, on the content, by using outlines having colors and patterns that differ from each other according to the one or more devices.

The server 3000 may apply edition features by the device 1000 to the content, based on edition information received from the device 1000. The server 3000 may, but is not limited to, overlap the region information and the edition information on the content. The server may then transmit content having the additional information applied thereto (operation S1170) and the display apparatus may then display content having the additional information applied thereto (operation S1180).

In the flowchart of FIG. 10, the server 3000 applies the additional information to the content, and in the flowchart of FIG. 11, the display apparatus 2000 applies the additional information to the content, but one or more exemplary embodiments are not limited thereto. That is, the device 1000 may display and change a partial region of the content, and may provide content of the displayed partial region or content of the changed partial region to the display apparatus 2000 or the server 3000. The device 1000 may provide entire content including the changed partial region to the display apparatus 2000 or the server 3000. In this case, the device 1000 may apply additional information including edition information and coordinate information to the content by performing predetermined image processing.

Figure 12:
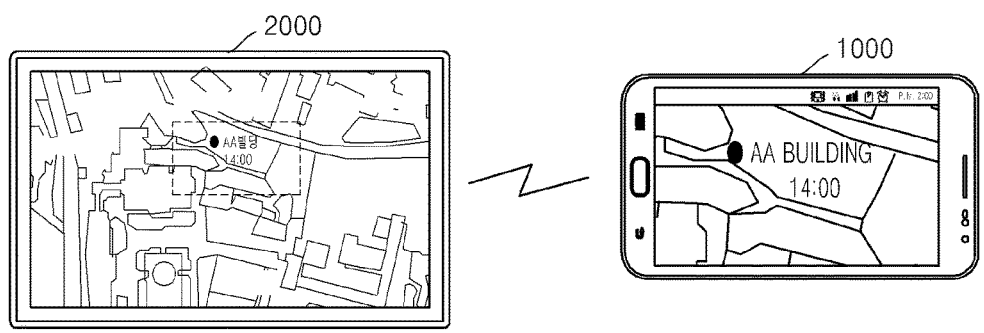
FIG. 12 illustrates an example of content displayed on the display apparatus and the device, when the content is a map image, according to an exemplary embodiment.

FIG. 12 illustrates an example of content displayed on the display apparatus 2000 and the device 1000, when the content is a map image, according to an exemplary embodiment.

Referring to FIG. 12, an image that corresponds to a partial region of the map image displayed on the display apparatus 2000 may be displayed on the device 1000. In this case, detailed region information about the partial region of the map image displayed on the display apparatus 2000 may be displayed on a screen of the device 1000. A user effectively checks the detailed region information about the partial region of the map image displayed on the display apparatus 2000 via the device 1000.

The user may write a meeting place and a meeting time to the partial region of the map image displayed on the display apparatus 2000, by using the device 1000. For example, the user may write 'AA building' and 'p.m. 14:00' to the partial region of the map image displayed on the display apparatus 2000. In this case, the display apparatus 2000 may be mounted on a notice board in a company.

As the device 1000 approaches the display apparatus 2000, the device 1000 may receive the map image from the display apparatus 2000 via local communication, and may display the received partial region of the map image, but one or more exemplary embodiments are not limited thereto.

Figure 13:
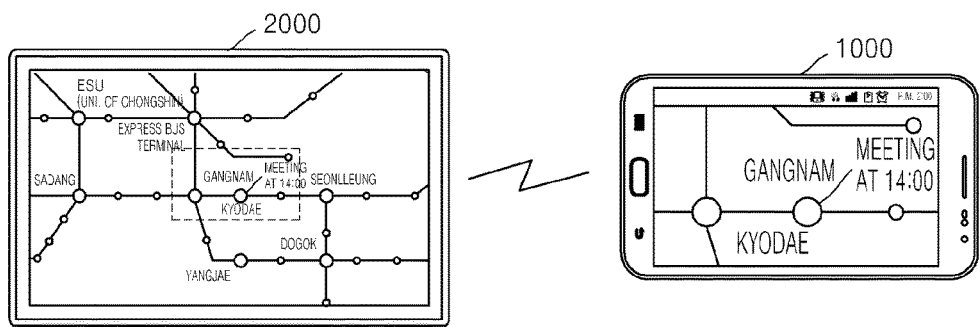
FIG. 13 illustrates an example of content displayed on the display apparatus and the device, when the content is a subway map image, according to an exemplary embodiment.

FIG. 13 illustrates an example of content displayed on the display apparatus 2000 and the device 1000, when the content is a subway map image, according to an exemplary embodiment.

Referring to FIG. 13, an image that corresponds to a partial region of the subway map image displayed on the display apparatus 2000 may be displayed on the device 1000. In this case, detailed information about the partial region of the subway map image displayed on the display apparatus 2000 may be displayed on a screen of the device 1000. For example, the detailed information may include, but is not limited to, subway exit information and subway transfer information.

A user may write a detail of a meeting and a meeting time to the partial region of the subway map image displayed on the display apparatus 2000, by using the device 1000. For example, the user may write 'meeting' and 'p.m. 14:00' to the partial region of the map image displayed on the display apparatus 2000.

As the device 1000 approaches the display apparatus 2000 that displays the subway map image, the device 1000 may receive the subway map image from the display apparatus 2000 via local communication, and may display the received partial region of the subway map image, but one or more exemplary embodiments are not limited thereto.

The display apparatus 2000 shown in FIGS. 12 and 13 may be arranged in a public place. For example, the display apparatus 2000 may be arranged in a shop, a resting place, a subway station, or the like. The display apparatus 2000 may display content such as a map image, a subway map, or the like which shows a circumference around a place in which the display apparatus 2000 is arranged. The device 1000 may receive the content displayed on the display apparatus 2000 from the display apparatus 2000 and may display the received content on a screen of the device 1000 via local communication. A partial region of the content may be enlarged and displayed on the device 1000.

Figure 14:
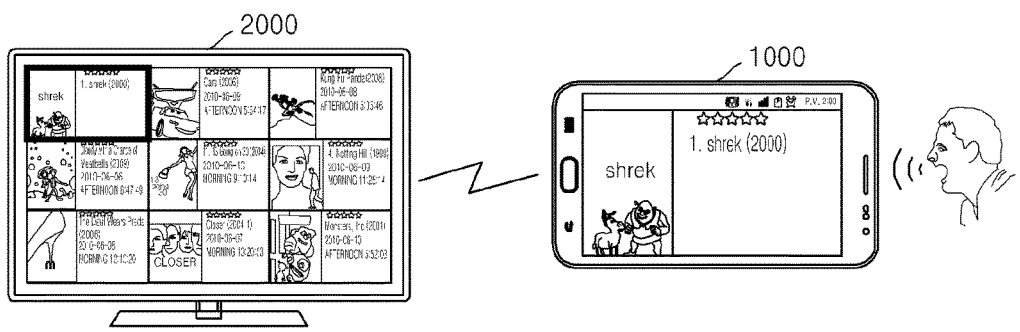
FIG. 14 illustrates an example of content displayed on the display apparatus and the device, when the content is an Electronic Program Guide (EPG) image, according to an exemplary embodiment.

FIG. 14 illustrates an example of content displayed on the display apparatus 2000 and the device 1000, when the content is an EPG image, according to an exemplary embodiment.

Referring to FIG. 14, an image that corresponds to a partial region of the EPG image displayed on the display apparatus 2000 may be displayed on the device 1000. In more detail, the image that corresponds to a program list included in the EPG image may be displayed on the device 1000.

In this case, detailed information about a predetermined program included in the EPG image that is displayed on the display apparatus 2000 may also be displayed on a screen of the device 1000. For example, the detailed information may include, but is not limited to, a producer of the program, users' evaluation with respect to the program, and summary information with respect to the program.

The device 1000 may change and display a partial region of the EPG image, based on a user input. For example, the device 1000 may change the partial region of the EPG image, based on movement of the device 1000 or a touch input by a user, and may display the partial region. In this case, the partial region of the EPG image may be changed by a unit of a program list. For example, when an image that corresponds to a first program list included in the EPG image is displayed on the device 1000, and the device 1000 receives a swipe input by a user, the device 1000 may display an image of a second program list adjacent to the first program list.

The device 1000 may provide the display device 2000 with a control command to control a program included in the partial region of the EPG image. The device 1000 may generate the control command to control the program included in the partial region of the EPG image, based on a user's voice input, and may transmit the generated control command to the display device 2000. For example, when a user says "reproduction", the device 1000 may generate a control command to reproduce a program displayed on the device 1000, and the display device 2000 may receive the control command and may reproduce the program displayed on the device 1000.

Figure 15:
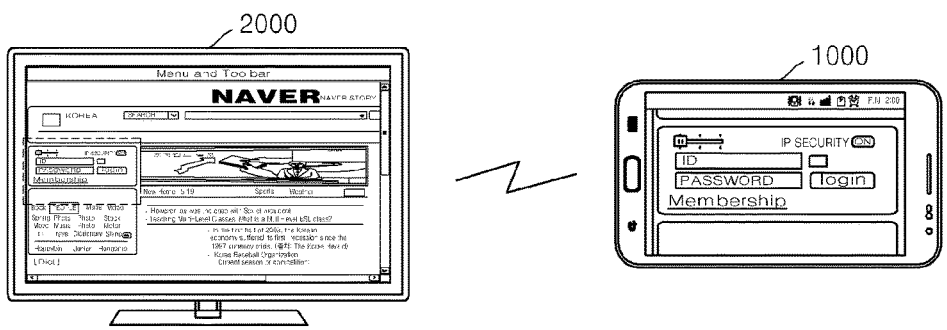
FIG. 15 illustrates an example of content displayed on the display apparatus and the device, when the content is a web browser screen, according to an exemplary embodiment.

FIG. 15 illustrates an example of content displayed on the display apparatus 2000 and the device 1000, when the content is a web browser screen, according to an exemplary embodiment.

Referring to FIG. 15, an image that corresponds to a partial region of a web browser displayed on the display apparatus 2000 may be displayed on the device 1000. In this case, an image that is an enlarged image of the partial region of the web browser displayed on the display apparatus 2000 may be displayed on a screen of the device 1000.

Figure 16:
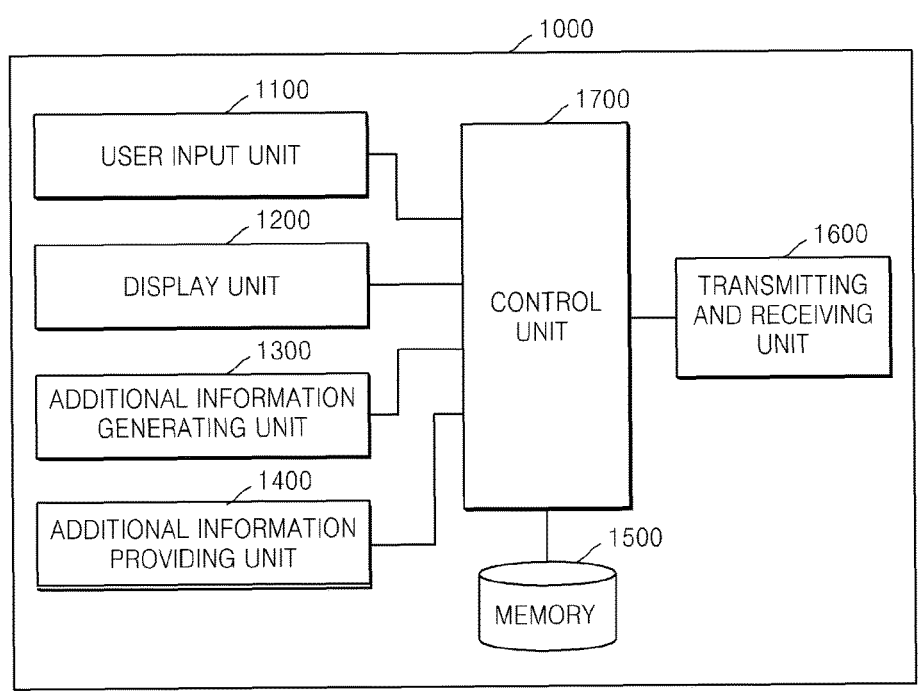
FIG. 16 is a block diagram of the device, according to an exemplary embodiment.

FIG. 16 is a block diagram of the device 1000, according to an exemplary embodiment.

As illustrated in FIG. 16, the device may include a user input unit 1100 (e.g., a user input), a display unit 1200 (e.g., a display), an additional information generating unit 1300 (e.g., an additional information generator), an additional information providing unit 1400 (e.g., an additional information provider), a memory 1500, a transmitting and receiving unit 1600 (e.g., a transceiver), and a control unit 1700 (e.g., a controller).

The user input unit 1100 receives a user input with respect to the device 1000. The user input unit 1100 may receive a user's touch input. In this case, the user input unit 1100 may receive the user's touch input via a touch screen of the device 1000, but one or more exemplary embodiments are not limited thereto. The user input unit 1100 receives a user input that involves moving the device 1000. For example, the user input unit 1100 may detect movement of the device 1000 by using, but is not limited to, a gyro sensor, an acceleration sensor, or a gravity sensor.

The user input that is received by the user input unit 1100 may be used when the device 1000 selects a partial region of content, and then enlarges or reduces the partial region. The user input that is received by the user input unit 1100 may be used when the device 1000 generates additional information with respect to the partial region of the content.

The display unit 1200 displays the content. The display unit 1200 may display the partial region of the content displayed on the display apparatus 2000. The display unit 1200 may enlarge or reduce the partial region of the content displayed on the display apparatus 2000, based on a user input, and may display the partial region. The display unit 1200 may move the partial region of the content to another region in an entire region of the content, based on a user input, and may display it. The display unit 1200 may display the additional information with respect to the partial region of the content.

The additional information generating unit 1300 generates the additional information with respect to the partial region of the content. For example, the additional information generating unit 1300 may generate the additional information with respect to the partial region of the content, based on a user input received by using a stylus, but one or more exemplary embodiments are not limited thereto. The additional information may include region information about the partial region of the content and edition information about the partial region of the content. The region information may indicate in which region of the entire region of the content that the partial region of the content displayed on a screen of the device 1000 is positioned, and for example, may include coordinate information. The edition information may be information related to user's edition with respect to the partial region of the content that is displayed on the screen of the device 1000, and for example, may include information about a line, a figure, and a color which are changed with respect to the partial region.

The additional information providing unit 1400 provides the additional information to the display apparatus 2000. The additional information providing unit 1400 may directly provide the additional information to the display apparatus 2000, but one or more exemplary embodiments are not limited thereto. The device 1000 may provide the additional information to the display apparatus 2000 via a separate server (not shown). In this case, the additional information may be stored in the separate server.

The memory 1500 stores various types of information to allow the device 1000 to share and display the content with the display apparatus 2000 and to edit, change, and display the partial region of the content.

The transmitting and receiving unit 1600 exchanges the various types of information with at least one of the display apparatus 2000 and the server 3000 to allow the device 1000 to share and display the content with the display apparatus 2000, and to edit, change, and display the partial region of the content. The transmitting and receiving unit 1600 may receive the content from the display apparatus 2000 or the server 3000. The transmitting and receiving unit 1600 may provide content to the display apparatus 2000.

The control unit 1700 controls the user input unit 1100, the display unit 1200, the additional information generating unit 1300, the additional information providing unit 1400, the memory 1500, and the transmitting and receiving unit 1600 to allow the device 1000 to share and display the content with the display apparatus 2000, and to edit, change, and display the partial region of the content.

Figure 17:
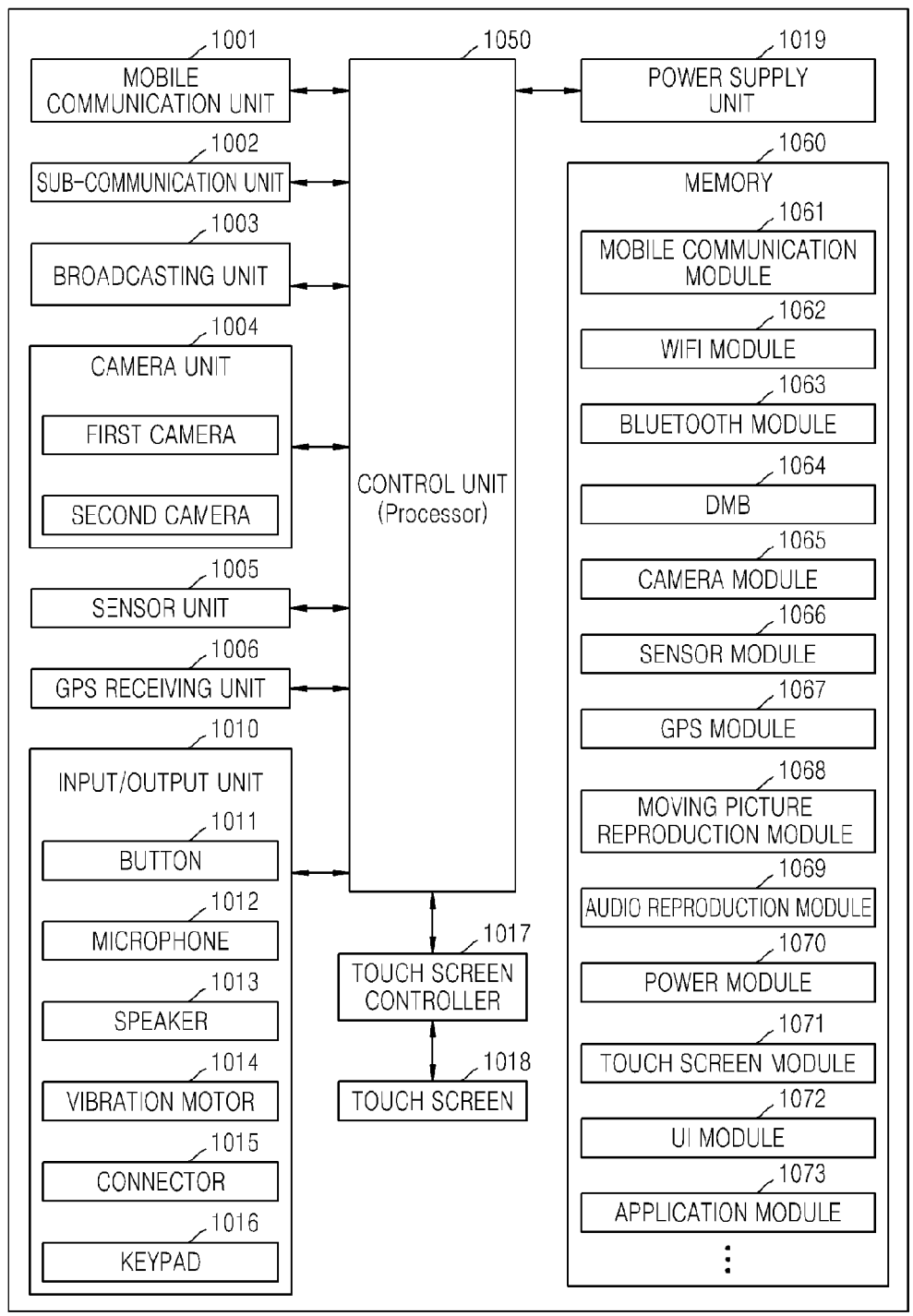
FIG. 17 is a block diagram of the device, according to an exemplary embodiment.

FIG. 17 is a block diagram of the device 1000, according to an exemplary embodiment.

A mobile communication unit 1001 performs a call set-up, data communication, or the like with a base station via a cellular network such as 3G/4G. A sub-communication unit 1002 performs a function for local communication such as Bluetooth, near field communication (NFC), or the like. A broadcasting unit 1003 receives a digital multimedia broadcasting (DMB) signal.

A camera unit 1004 includes a lens and optical devices for capturing an image or shooting a moving picture.

A sensor unit 1005 may include a gravity sensor to detect movement of the device 1000, an illumination intensity sensor to detect intensity of light, a proximity sensor to detect proximity of a person, a motion sensor to detect movement of a person, or the like.

A GPS receiving unit 1006 receives a GPS signal from an artificial satellite. Various services may be provided to a user by using the GPS signal.

An input/output unit 1010 provides an interface with an external device or a person, and includes a button 1011, a microphone 1012, a speaker 1013, a vibration motor 1014, a connector 1015, and a keypad 1016.

A touch screen 1018 receives a touch input by a user. Here, the touch input may occur due to a drag gesture or a tap gesture. A touch screen controller 1017 delivers the touch input, which is input via the touch screen 1018, to a control unit 1050. A power supply unit 1019 is connected to a battery or an external power source to supply a power to the device 1000.

The control unit 1050 may include a processor which executes programs stored in a memory 1060, thereby displaying and changing a partial region of content displayed on the display apparatus 2000.

The programs stored in the memory 1060 may be divided into a plurality of modules according to their functions, and for example, may be divided into a mobile communication module 1061, a WiFi module 1062, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, an UI module 1072, an application module 1073, or the like. A function of each of the aforementioned modules may be intuitionally reasoned by one of ordinary skill in the art in view of its name.

Hereinafter, the application module 1073 is described in detail. The application module 1073 allows the device 1000 to display and change the partial region of the content displayed on the display apparatus 2000.

The application module 1073 may receive a user input via the touch screen module 1071 and the sensor module 1066. The user input that is received by the application module 1073 may be used when the application module 1073 selects the partial region of the content, and enlarges, reduces, or moves the partial region. The user input that is received by the application module 1073 may be used when the application module 1073 generates additional information with respect to the partial region of the content.

The application module 1073 may display the content via the touch screen module 1071. The application module 1073 may display the partial region of the content that is displayed on the display apparatus 2000. The application module 1073 may enlarge or reduce the partial region of the content, based on a user input, and may display it. The application module 1073 may move the partial region of the content to another region in an entire region of the content, based on a user input, and may display it. The application module 1073 may display the additional information with respect to the partial region of the content.

The application module 1073 may generate the additional information with respect to the partial region of the content. For example, the application module 1073 may generate the additional information with respect to the partial region of the content, based on a user input received by using a stylus, but one or more exemplary embodiments are not limited thereto. The additional information may include region information about the partial region of the content and edition information about the partial region of the content. The region information may indicate in which region of the entire region of the content that the partial region of the content displayed on a screen of the device 1000 is positioned, and for example, may include coordinate information. The edition information may be information related to user's edition with respect to the partial region of the content that is displayed on the screen of the device 1000, and for example, may include information about a line, a figure, and a color which are changed with respect to the partial region.

The application module 1073 may provide the additional information to the display apparatus 2000. The application module 1073 may directly provide the additional information to the display apparatus 2000, but one or more exemplary embodiments are not limited thereto. The application module 1073 may provide the additional information to the display apparatus 2000 via a separate server (not shown). In this case, the additional information may be stored in the separate server.

Figure 18:
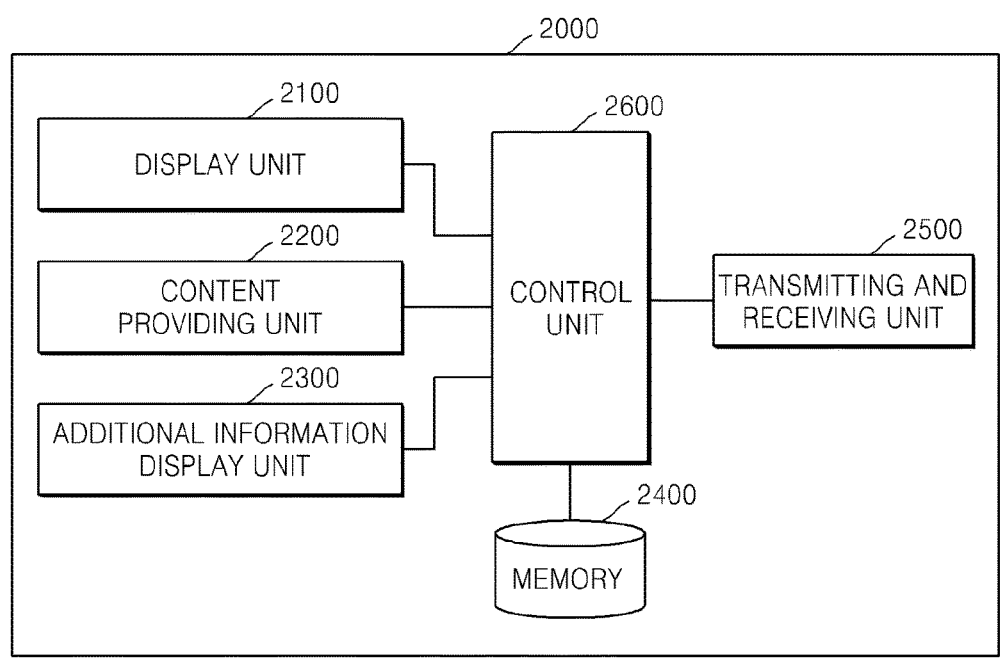
FIG. 18 is a block diagram of the display apparatus, according to an exemplary embodiment.

FIG. 18 is a block diagram of the display apparatus 2000, according to an exemplary embodiment.

Referring to FIG. 18, the display apparatus 2000 includes a display unit 2100 (e.g., a display), a content providing unit 2200 (e.g., a content provider), an additional information display unit 2300 (e.g., an additional information display), a memory 2400, a transmitting and receiving unit 2500 (e.g., a transceiver), and a control unit 2600 (e.g., a controller).

The display unit 2100 displays content. The display unit 2100 may display content that is stored in the display apparatus 2000, but one or more exemplary embodiments are not limited thereto. The display unit 2100 may display content that is transmitted from the server or the device 1000. The display unit 2100 may display an entire region of the content.

The content providing unit 2200 provides content, which is displayed on the display apparatus 2000, to the device 1000 or the server 3000. When the device 1000 approaches within a preset range from the display apparatus 2000, the content providing unit 2200 may provide the content to the device 1000 via local communication.

The additional information display unit 2300 applies additional information with respect to a partial region of content, which is received from the device 1000 or the server 3000, to the content and displays it. The additional information may include region information about the partial region and edition information about the partial region. The region information may indicate in which region of an entire region that the partial region of the content displayed on a screen of the device 1000 is positioned, and for example, may include coordinate information. The edition information may be information related to user's edition with respect to the partial region of the content that is displayed on the screen of the device 1000, and for example, may include information about a line, a figure, and a color which are changed with respect to the partial region.

Based on the region information received from the device 1000, the additional information display unit 2300 may mark a region corresponding to the partial region that is displayed on the device 1000 to allow the region to differ in the entire region of the content displayed on the display apparatus 2000. For example the additional information display unit 2300 may mark the region corresponding to the partial region that is displayed on the device 1000, by using an outline having a predetermined color and pattern. If one or more devices display the partial region of the content that is displayed on the display apparatus 2000, the additional information display unit 2300 may mark regions that are displayed in the one or more devices, respectively, on the content displayed on the display apparatus 2000, by using outlines having colors and patterns that differ from each other according to the one or more devices.

The additional information display unit 2300 may apply edition features by the device 1000 to the content that is displayed on the display apparatus 2000, based on the edition information received from the device 1000, and may display the content.

The memory 2400 stores various types of information to allow the display apparatus 2000 to display the entire region of the content and to apply the partial region of the content and the edition information about the partial region of the content, which is displayed on the device 1000, to the content.

The transmitting and receiving unit 2500 exchanges the various types of information with the device 1000 and the server 3000 to allow the display apparatus 2000 to display the entire region of the content and to apply the partial region of the content and the edition information about the partial region of the content, which is displayed on the device 1000, to the content. The transmitting and receiving unit 2500 may transmit the content, which is displayed on the display apparatus 2000, to at least one of the device 1000 and the server 3000. If at least two devices display partial regions of the content that is displayed on the display apparatus 2000, the transmitting and receiving unit 2500 may provide edition information about the partial region of the content, which is generated by a first device (not shown), to a second device (not shown).

The control unit 2600 controls all operations of the display apparatus 2000, and controls the display unit 2100, the content providing unit 2200, the additional information display unit 2300, the memory 2400, and the transmitting and receiving unit 2500 to allow the display apparatus 2000 to display the entire region of the content and to apply the partial region of the content and the edition information about the partial region of the content, which is displayed on the device 1000, to the content.

Figure 19:
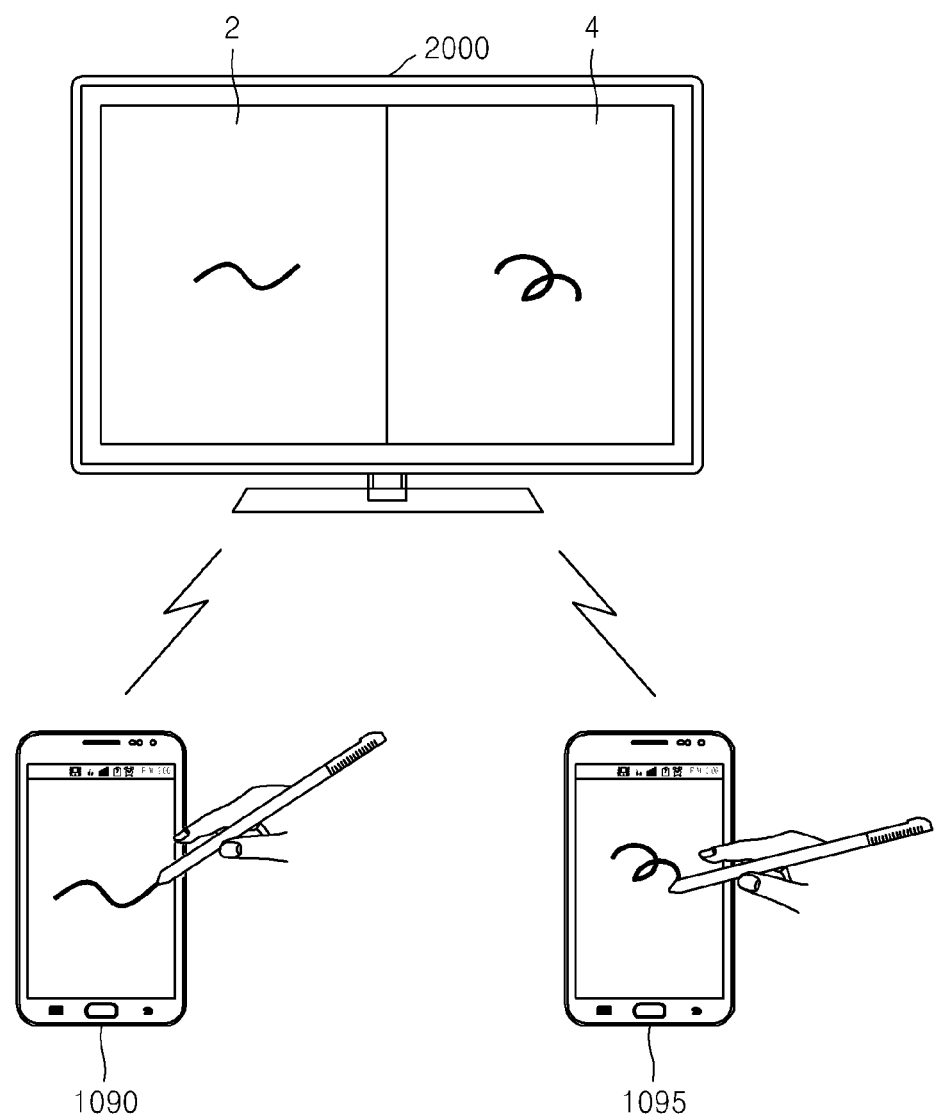
FIG. 19 illustrates an example in which two pieces of edition information that are generated by two devices are displayed on the display apparatus, according to an exemplary embodiment.

FIG. 19 illustrates an example in which two pieces of edition information that are generated by two devices 1090 and 1095 are displayed on the display apparatus 2000, according to an exemplary embodiment.

Referring to FIG. 19, when content is not displayed on the display apparatus 2000, the two pieces of edition information that are generated by the devices 1090 and 1095 may be provided to the display apparatus 2000, and based on the provided edition information, content may be generated in the display apparatus 2000.

In this case, a region 2 that corresponds to the device 1090 and a region 4 that corresponds to the device 1095 may be marked on a screen of the display apparatus 2000. The device 1090 may generate the edition information based on a user input by using a stylus and may provide the edition information to the display apparatus 2000.

Afterward, the display apparatus 2000 may display the edition information from the device 1090 on the region 2, and may display the edition information from the device 1095 on the region, so that the display apparatus 2000 may generate the content.

The display apparatus 2000 may receive a plurality of pieces of edition information which are generated by the devices 1090 and 1095 after the content is generated, and may apply the received edition information to the generated content.

The display apparatus 2000 may distinguish between the region 2 and the region 4 that are displayed on the screen. The display apparatus 2000 may distinguish between the region 2 and the region 4 by differentiating at least one of a color and a pattern of outlines of the region 2 and the region 4, but one or more exemplary embodiments are not limited thereto. The display apparatus 2000 may display ID values of the device 1090 and the device 1095 on the region 2 and the region 4, respectively.

In the exemplary embodiment of FIG. 19, all of the device 1090, the device 1095, and the display apparatus 2000 may be positioned in a home network, but one or more exemplary embodiments are not limited thereto. That is, at least one of the device 1090, the device 1095, and the display apparatus 2000 may be positioned outside the home network. In this case, devices in the home network may exchange data with each other via local communication and may exchange data with a device outside the home network via a wide area network.

The one or more exemplary embodiments may be embodied as a recording medium, e.g., a program module to be executed in computers, which include computer-readable commands. The computer storage medium may include any usable medium that may be accessed by computers, volatile and non-volatile medium, and detachable and non-detachable medium. The computer storage medium may include a computer storage medium and a communication medium. The computer storage medium includes all of volatile and non-volatile medium, and detachable and non-detachable medium which are designed to store information including computer readable commands, data structures, program modules or other data. The communication medium includes computer-readable commands, a data structure, a program module, and other transmission mechanism, and includes other information transmission mediums.

The exemplary embodiments may, however, be embodied in many different forms and should not be construed as being limited to the exemplary embodiments set forth herein; rather, these embodiments are provided so that this disclosure will be thorough and complete, and will fully convey the inventive concept to those of ordinary skill in the art. For example, configuring elements that are singular forms may be executed in a distributed fashion, and also, configuring elements that are distributed may be combined and then executed.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of displaying content, the method performed by a device and comprising:
receiving content displayed on an external display apparatus;
displaying a partial region of an entire region of the content on the device while simultaneously displaying the entire region of the content on the external display apparatus;
generating edit information on the partial region, based on a user input to the device; and
providing first region information representing the partial region and the edit information to the external display apparatus;
detecting a movement of the device;
simultaneously changing the partial region of the entire region of the content in response to detecting the movement of the device;
displaying the changed partial region of the entire region of the content;
providing second region information representing the changed partial region to the external display apparatus, and
wherein a region is visually demarcated, based on the first region information, within the entire region of the content on the external display apparatus by outlining the region using a distinctive mark, and the demarcated region is corresponding to a location of the partial region,
wherein the demarcated region is simultaneously moved, by the external display apparatus, on the entire region of the content in response to receiving the second region information, and
wherein an identifier which is indicative of the device is displayed adjacent to the distinctive mark within the entire region of the content on the external display apparatus.

2. The method of claim 1,
wherein the edit information comprises information about at least one of a line, a figure, and a color which are added, changed, or removed with respect to the partial region.

3. The method of claim 1,
wherein the first region information is used by the external display apparatus to display the demarcated region, and the second region information is used by the external display apparatus to move the demarcated region to a location corresponding to the changed partial region.

4. The method of claim 1,
wherein the first region information includes coordinate information of the partial region, and the second region information includes coordinate information of the changed partial region.

5. The method of claim 4, wherein the changing the partial region comprises:
enlarging or reducing the partial region of the entire region of the content, based on the movement of the device.

6. The method of claim 1, wherein the receiving the content comprises receiving the content from the external display apparatus.

7. The method of claim 1, wherein the receiving the content comprises receiving the content from a separate server that is connected with the device and the external display apparatus.

8. The method of claim 1, the method further comprising:
receiving high image-quality content with respect to the changed partial region from the external display apparatus; and
displaying the high image-quality content.

9. The method of claim 1, wherein the displaying the partial region further comprises:
providing coordinate information of the partial region to a separate server that is connected with the device and the external display apparatus;
receiving high image-quality content with respect to the partial region from the server; and
displaying the high image-quality content.

10. At least one non-transitory computer-readable recording medium for storing a computer program configured to be readable by at least one processor to instruct the at least one processor to execute a computer process for performing the method of claim 1.

11. A device comprising:
a memory which stores at least one program; and
a processor which is configured to execute the at least one program,
wherein the at least one program comprises instructions which perform:
receiving content displayed on an external display apparatus;
displaying a partial region of an entire region of the content on the device while simultaneously displaying the entire region of the content on the external display apparatus;
generating edit information on the partial region, based on a user input; and
providing first region information representing the partial region and the edit information to the external display apparatus;
detecting a movement of the device;
simultaneously changing the partial region of the entire region of the content in response to detecting the movement of the device;
displaying the changed partial region of the entire region of the content;
providing second region information representing the changed partial region to the external display apparatus, and
wherein a region is visually demarcated, based on the first region information, within the entire region of the content on the external display apparatus by outlining the region using a distinctive mark, and the demarcated region is corresponding to a location of the partial region,
wherein the demarcated region is simultaneously moved, by the external display apparatus, on the entire region of the content in response to receiving the second region information, and
wherein an identifier which is indicative of the device is displayed adjacent to the distinctive mark within the entire region of the content on the external display apparatus.

12. The device of claim 11,
wherein the edit information comprises information about at least one of a line, a figure, and a color which are added, changed, or removed with respect to the partial region.

13. The device of claim 11,
wherein the first region information is used by the external display apparatus to display the demarcated region, and the second region information is used by the external display apparatus to move the demarcated region to a location corresponding to the changed partial region.

14. The device of claim 11,
wherein the first region information includes coordinate information of the partial region, and the second region information includes coordinate information of the changed partial region.

15. The device of claim 14, wherein the changing the partial region comprises:
enlarging or reducing the partial region of the entire region of the content, based on the movement of the device.

16. The device of claim 11, wherein the receiving the content comprises receiving the content from the external display apparatus.

17. The device of claim 11, wherein the receiving the content comprises receiving the content from a separate server that is connected with the device and the external display apparatus.

18. The device of claim 11, wherein the at least one program comprises further instructions which perform:
receiving high image-quality content with respect to the changed partial region from the external display apparatus; and
displaying the high image-quality content.

19. The device of claim 11, wherein the displaying of the partial region further comprises:
providing coordinate information of the partial region to a separate server that is connected with the device and the external display apparatus;
receiving high image-quality content with respect to the partial region from the server; and
displaying the high image-quality content.

* * * * *